(12) United States Patent
Yamanobe

(10) Patent No.: US 10,112,410 B2
(45) Date of Patent: Oct. 30, 2018

(54) INK JET PRINTING APPARATUS AND COLOR CONVERSION PROCESSING DEVICE

(71) Applicant: FUJIFILM CORPORATION, Tokyo (JP)

(72) Inventor: Jun Yamanobe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/713,709

(22) Filed: Sep. 25, 2017

(65) Prior Publication Data
US 2018/0086099 A1   Mar. 29, 2018

(30) Foreign Application Priority Data
Sep. 26, 2016  (JP) ................. 2016-187102

(51) Int. Cl.
| | | |
|---|---|---|
| *B41J 2/045* | (2006.01) | |
| *B41J 2/21* | (2006.01) | |
| *B41J 2/205* | (2006.01) | |
| *B41J 13/00* | (2006.01) | |
| *B65H 63/00* | (2006.01) | |
| *B41J 29/38* | (2006.01) | |
| *H04N 1/60* | (2006.01) | |

(52) U.S. Cl.
CPC ......... *B41J 2/2146* (2013.01); *B41J 2/04593* (2013.01); *B41J 2/2054* (2013.01); *B41J 13/0036* (2013.01); *B41J 29/38* (2013.01); *B65H 63/00* (2013.01); *B41J 2/04543* (2013.01); *H04N 1/6025* (2013.01)

(58) Field of Classification Search
CPC ... B41J 2/04593; B41J 2/04595; B41J 2/2054
See application file for complete search history.

(56) References Cited

U.S. PATENT DOCUMENTS

| | | | | |
|---|---|---|---|---|
| 2010/0194815 A1* | 8/2010 | Furukawa | ............... | B41J 29/17 347/16 |
| 2014/0092162 A1* | 4/2014 | Nishihara | .............. | B41J 29/393 347/19 |
| 2014/0292882 A1* | 10/2014 | Oizumi | ............... | B41J 13/0009 347/16 |

FOREIGN PATENT DOCUMENTS

JP    2015003413    1/2015

* cited by examiner

*Primary Examiner* — Jason Uhlenhake
(74) *Attorney, Agent, or Firm* — JCIPRNET

(57) ABSTRACT

There are provided an ink jet printing apparatus and a color conversion processing device that can prevent the generation of offset and blocking and can stably jet ink. A first LUT in which a total amount of ink after conversion is large overall and a second LUT in which a total amount of ink after conversion is small overall are prepared as a look-up table (LUT) that is used in color conversion processing. A LUT to be used is selected according to the number of printed mediums. The first LUT is selected in a case in which the number of printed mediums is smaller than a threshold value, and the second LUT is selected in a case in which the number of printed mediums is equal to or larger than a threshold value.

20 Claims, 23 Drawing Sheets

FIG. 5

| INPUT COLOR VALUE 0 TO 255 GRADATIONS | | | FIRST LUT 0 TO 100 % | | | | | | | SECOND LUT 0 TO 100 % | | | | | | |
|---|---|---|---|---|---|---|---|---|---|---|---|---|---|---|---|---|
| R | G | B | C | M | Y | K | R | G | B | C | M | Y | K | R | G | B |
| 0 | 0 | 255 | 88 | 77 | 0 | 0 | 0 | 0 | 0 | 0 | 0 | 0 | 0 | 0 | 0 | 100 |
| 0 | 0 | 254 | 87 | 76 | 0 | 0 | 0 | 0 | 0 | 0 | 0 | 0 | 0 | 0 | 0 | 99 |
| 0 | 0 | 253 | 86 | 75 | 0 | 0 | 0 | 0 | 0 | 0 | 0 | 0 | 0 | 0 | 0 | 98 |
| ... | ... | ... | ... | ... | ... | ... | ... | ... | ... | ... | ... | ... | ... | ... | ... | ... |
| 0 | 255 | 0 | 63 | 0 | 100 | 0 | 0 | 0 | 0 | 0 | 0 | 0 | 0 | 0 | 100 | 0 |
| ... | ... | ... | ... | ... | ... | ... | ... | ... | ... | ... | ... | ... | ... | ... | ... | ... |
| 255 | 0 | 0 | 0 | 99 | 100 | 0 | 0 | 0 | 0 | 0 | 0 | 0 | 0 | 100 | 0 | 0 |
| ... | ... | ... | ... | ... | ... | ... | ... | ... | ... | ... | ... | ... | ... | ... | ... | ... |
| 255 | 255 | 0 | 0 | 0 | 100 | 0 | 0 | 0 | 0 | 0 | 0 | 100 | 0 | 0 | 0 | 0 |
| 255 | 255 | 254 | 2 | 0 | 98 | 0 | 0 | 0 | 0 | 2 | 0 | 98 | 0 | 0 | 0 | 0 |
| ... | ... | ... | ... | ... | ... | ... | ... | ... | ... | ... | ... | ... | ... | ... | ... | ... |
| 127 | 255 | 0 | 0 | 0 | 0 | 0 | 60 | 0 | 0 | 0 | 0 | 0 | 0 | 60 | 0 | 0 |
| ... | ... | ... | ... | ... | ... | ... | ... | ... | ... | ... | ... | ... | ... | ... | ... | ... |

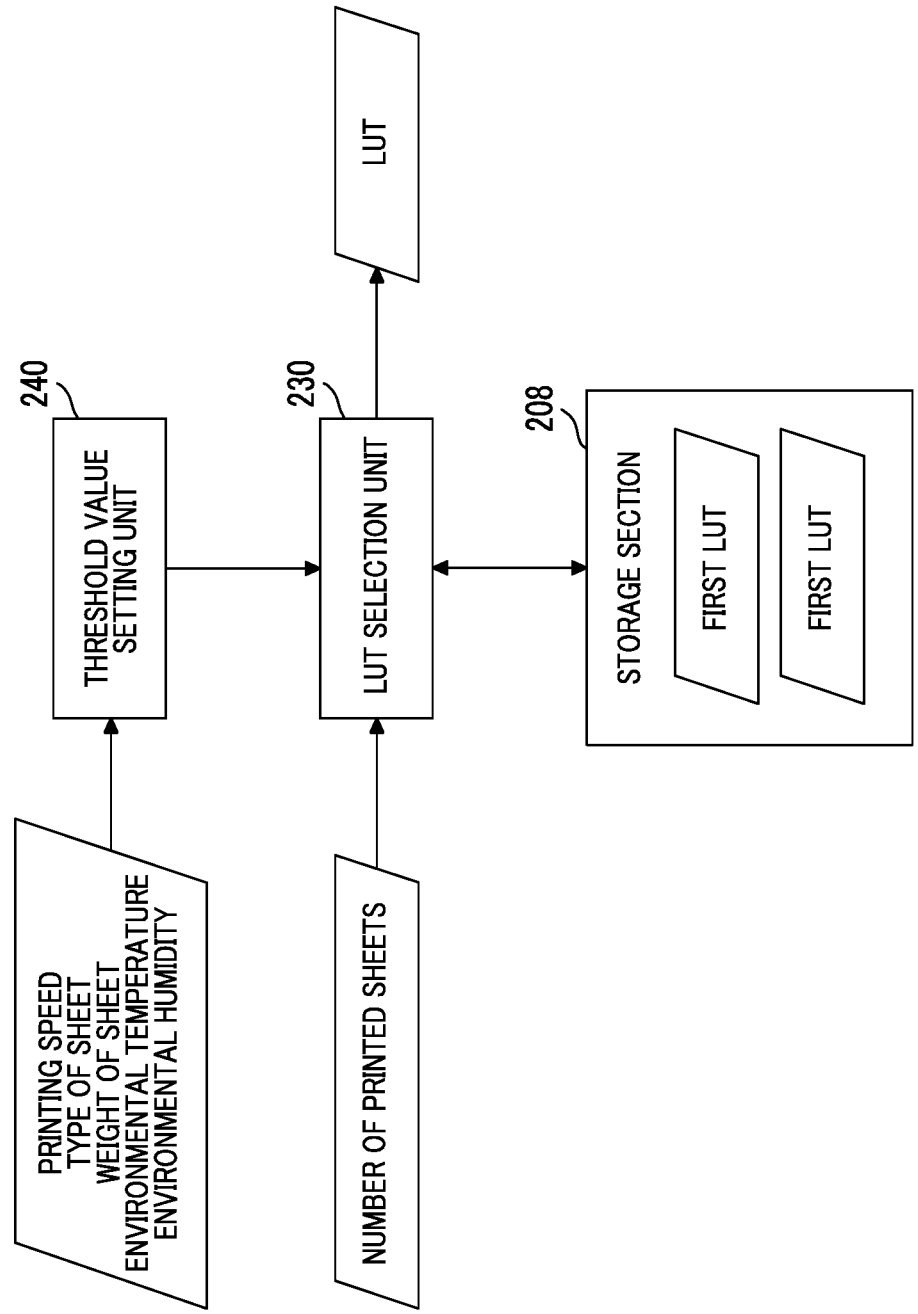

FIG. 9

| TYPE OF SHEET | ENVIRONMENTAL TEMPERATURE /HUMIDITY | WEIGHT OF SHEET | PRINTING SPEED | THRESHOLD VALUE |
|---|---|---|---|---|
| HIGH-PERMEABLE SHEET (HIGH-QUALITY PAPER) | Zone-1 | SMALLER THAN 200 gsm | LOW SPEED | 2000 |
| | | | HIGH SPEED | 1500 |
| | | EQUAL TO OR LARGER THAN 200 gsm | LOW SPEED | 1000 |
| | | | HIGH SPEED | 800 |
| | Zone-2 | SMALLER THAN 200 gsm | LOW SPEED | 1800 |
| | | | HIGH SPEED | 1300 |
| | | EQUAL TO OR LARGER THAN 200 gsm | LOW SPEED | 800 |
| | | | HIGH SPEED | 600 |
| LOW-PERMEABLE SHEET (COATED PAPER) | Zone-1 | SMALLER THAN 200 gsm | LOW SPEED | 600 |
| | | | HIGH SPEED | 500 |
| | | EQUAL TO OR LARGER THAN 200 gsm | LOW SPEED | 400 |
| | | | HIGH SPEED | 300 |
| | Zone-2 | SMALLER THAN 200 gsm | LOW SPEED | 500 |
| | | | HIGH SPEED | 400 |
| | | EQUAL TO OR LARGER THAN 200 gsm | LOW SPEED | 300 |
| | | | HIGH SPEED | 200 |

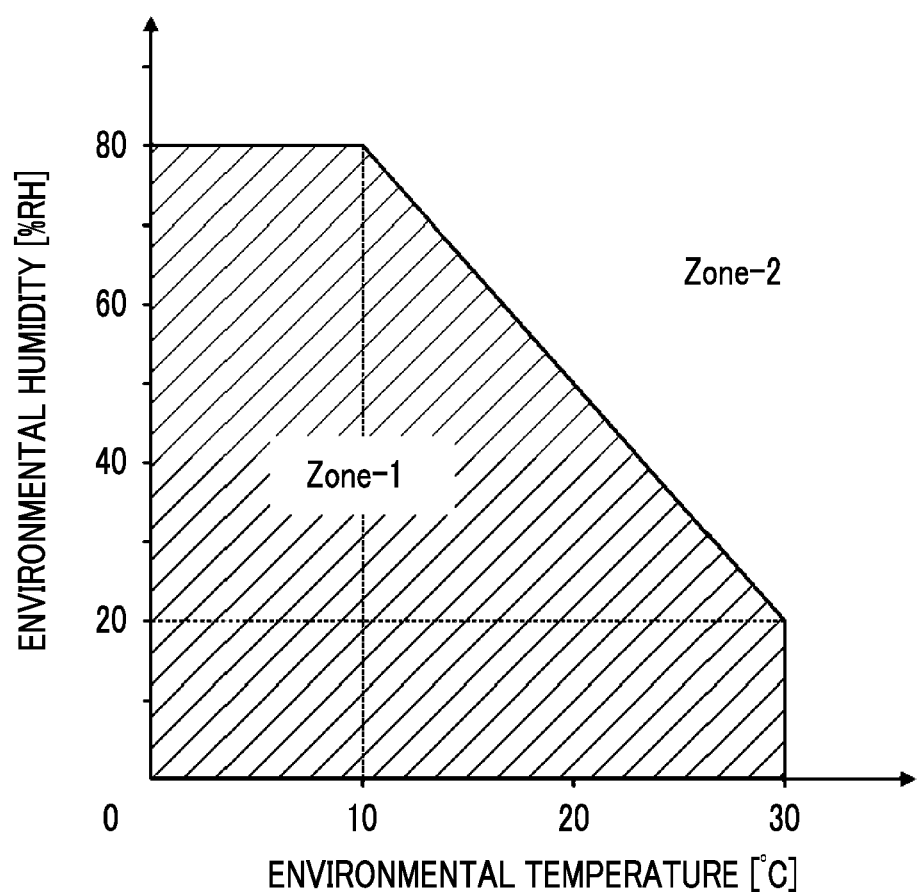

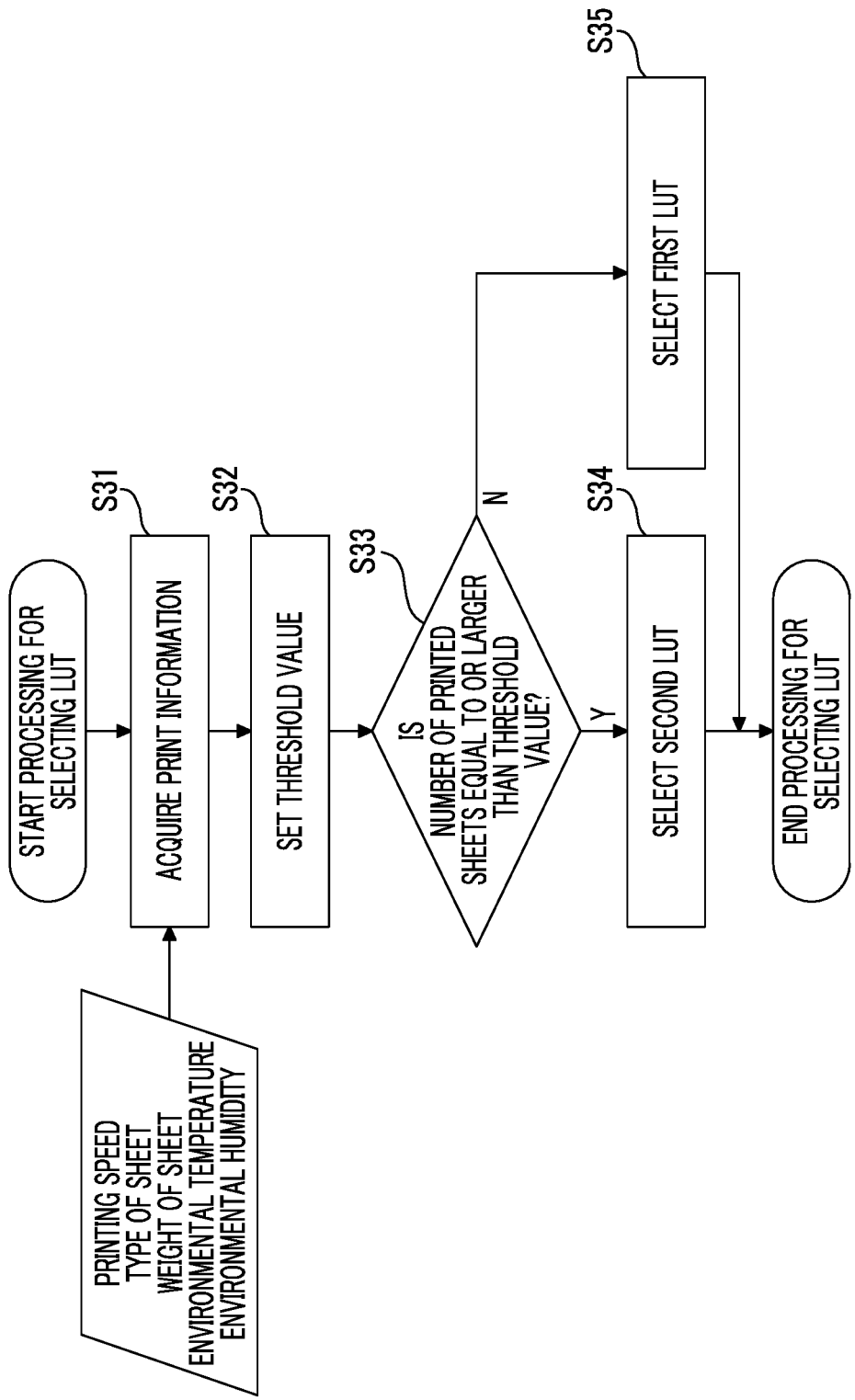

FIG. 12

| INPUT COLOR VALUE 0 TO 255 GRADATIONS | | | FIRST COMBINATION α 0 TO 100 % | | | | | | | SECOND COMBINATION β 0 TO 100 % | | | | | | |
|---|---|---|---|---|---|---|---|---|---|---|---|---|---|---|---|---|
| R | G | B | C | M | Y | K | R | G | B | C | M | Y | K | R | G | B |
| 0 | 0 | 255 | 88 | 77 | 0 | 0 | 0 | 0 | 0 | 0 | 0 | 0 | 0 | 0 | 0 | 100 |
| ... | ... | ... | ... | ... | ... | ... | ... | ... | ... | ... | ... | ... | ... | ... | ... | ... |
| 0 | 255 | 0 | 63 | 0 | 100 | 0 | 0 | 0 | 0 | 0 | 0 | 0 | 0 | 0 | 100 | 0 |
| ... | ... | ... | ... | ... | ... | ... | ... | ... | ... | ... | ... | ... | ... | ... | ... | ... |
| 255 | 0 | 0 | 0 | 99 | 100 | 0 | 0 | 0 | 0 | 0 | 0 | 0 | 0 | 100 | 0 | 0 |
| ... | ... | ... | ... | ... | ... | ... | ... | ... | ... | ... | ... | ... | ... | ... | ... | ... |

FIG. 13

| INPUT COLOR VALUE 0 TO 255 GRADATIONS ||| FIRST LUT 0 TO 100% |||||||| THIRD LUT 0 TO 100% |||||||| SECOND LUT 0 TO 100% ||||||||
|---|---|---|---|---|---|---|---|---|---|---|---|---|---|---|---|---|---|---|---|---|---|---|---|---|---|
| R | G | B | COMBINATION | C | M | Y | K | R | G | COMBINATION | C | M | Y | K | R | G | B | COMBINATION | C | M | Y | K | R | G | B |
| 0 | 0 | 255 | α | 88 | 77 | 0 | 0 | 0 | 0 | α | 88 | 77 | 0 | 0 | 0 | 0 | 0 | β | 0 | 0 | 0 | 0 | 0 | 0 | 100 |
| ... | ... | ... | ... | ... | ... | ... | ... | ... | ... | ... | ... | ... | ... | ... | ... | ... | ... | ... | ... | ... | ... | ... | ... | ... | ... |
| 0 | 255 | 0 | α | 63 | 0 | 100 | 0 | 0 | 0 | α | 63 | 0 | 100 | 0 | 0 | 0 | 0 | β | 0 | 0 | 0 | 0 | 0 | 100 | 0 |
| ... | ... | ... | ... | ... | ... | ... | ... | ... | ... | ... | ... | ... | ... | ... | ... | ... | ... | ... | ... | ... | ... | ... | ... | ... | ... |
| 255 | 0 | 0 | α | 0 | 99 | 100 | 0 | 0 | 0 | β | 0 | 0 | 0 | 0 | 100 | 0 | 0 | β | 0 | 0 | 0 | 0 | 100 | 0 | 0 |
| ... | ... | ... | ... | ... | ... | ... | ... | ... | ... | ... | ... | ... | ... | ... | ... | ... | ... | ... | ... | ... | ... | ... | ... | ... | ... |

FIG. 18

| TYPE OF SHEET | PREVIOUS PRINTING | | | | THIS PRINTING | | | CONCERN ABOUT GENERATION |
|---|---|---|---|---|---|---|---|---|
| | ENVIRONMENTAL TEMPERATURE /HUMIDITY | WEIGHT OF SHEET | NUMBER OF PRINTED SHEETS | LUT | NUMBER OF PRINTED SHEETS | WEIGHT OF SHEET | PRINTING SPEED | |
| HIGH-PERMEABLE SHEET (HIGH-QUALITY PAPER) | ARBITRARY | ARBITRARY | SMALLER THAN 300 | ARBITRARY | ARBITRARY | ARBITRARY | ARBITRARY | THERE IS NO CONCERN |
| | | SMALLER THAN 200 gsm | QUAL TO OR LARGER THAN 300 AND SMALLER THAN 1000 | FIRST LUT | SMALLER THAN 100 | ARBITRARY | ARBITRARY | THERE IS NO CONCERN |
| | | | | | EQUAL TO OR LARGER THAN 100 AND SMALLER THAN 300 | SMALLER THAN 200 gsm | ARBITRARY | THERE IS NO CONCERN |
| | | | | | | EQUAL TO OR LARGER THAN 200 gsm | ARBITRARY | THERE IS CONCERN |
| | | | | | EQUAL TO OR LARGER THAN 300 | ARBITRARY | ARBITRARY | THERE IS CONCERN |
| | | | | SECOND LUT | SMALLER THAN 200 | ARBITRARY | ARBITRARY | THERE IS NO CONCERN |
| | | | | | EQUAL TO OR LARGER THAN 200 AND SMALLER THAN 500 | SMALLER THAN 200 gsm | ARBITRARY | THERE IS NO CONCERN |
| | | | | | | EQUAL TO OR LARGER THAN 200 gsm | ARBITRARY | THERE IS CONCERN |
| | | | | | EQUAL TO OR LARGER THAN 500 | ARBITRARY | ARBITRARY | THERE IS CONCERN |
| | | | QUAL TO OR LARGER THAN 1000 AND SMALLER THAN 1500 | FIRST LUT | ARBITRARY | ARBITRARY | ARBITRARY | THERE IS CONCERN |
| | | | | SECOND LUT | SMALLER THAN 300 | ARBITRARY | ARBITRARY | THERE IS NO CONCERN |
| | | | | | EQUAL TO OR LARGER THAN 300 | ARBITRARY | ARBITRARY | THERE IS CONCERN |
| | | | EQUAL TO OR LARGER THAN 1500 | ARBITRARY | ARBITRARY | ARBITRARY | ARBITRARY | THERE IS CONCERN |
| | | EQUAL TO OR LARGER THAN 200 gsm | QUAL TO OR LARGER THAN 200 AND SMALLER THAN 800 | FIRST LUT | SMALLER THAN 100 | ARBITRARY | ARBITRARY | THERE IS NO CONCERN |
| | | | | | EQUAL TO OR LARGER THAN 100 AND SMALLER THAN 300 | SMALLER THAN 200 gsm | ARBITRARY | THERE IS NO CONCERN |
| | | | | | | EQUAL TO OR LARGER THAN 200 gsm | ARBITRARY | THERE IS CONCERN |
| | | | | | EQUAL TO OR LARGER THAN 300 | ARBITRARY | ARBITRARY | THERE IS CONCERN |
| | | | | SECOND LUT | SMALLER THAN 200 | ARBITRARY | ARBITRARY | THERE IS NO CONCERN |
| | | | | | EQUAL TO OR LARGER THAN 200 AND SMALLER THAN 500 | SMALLER THAN 200 gsm | ARBITRARY | THERE IS NO CONCERN |
| | | | | | | EQUAL TO OR LARGER THAN 200 gsm | ARBITRARY | THERE IS CONCERN |
| | | | | | EQUAL TO OR LARGER THAN 500 | ARBITRARY | ARBITRARY | THERE IS CONCERN |
| | | | | FIRST LUT | ARBITRARY | ARBITRARY | ARBITRARY | THERE IS CONCERN |
| | | | | SECOND LUT | SMALLER THAN 300 | ARBITRARY | ARBITRARY | THERE IS NO CONCERN |
| | | | | | EQUAL TO OR LARGER THAN 300 | ARBITRARY | ARBITRARY | THERE IS CONCERN |
| | | | ARBITRARY | ARBITRARY | ARBITRARY | ARBITRARY | ARBITRARY | THERE IS CONCERN |
| LOW-PERMEABLE SHEET (COATED PAPER) | ARBITRARY | ARBITRARY | SMALLER THAN 200 | ARBITRARY | ARBITRARY | ARBITRARY | ARBITRARY | THERE IS NO CONCERN |
| | | SMALLER THAN 200 gsm | QUAL TO OR LARGER THAN 200 AND SMALLER THAN 500 | FIRST LUT | SMALLER THAN 100 | ARBITRARY | ARBITRARY | THERE IS NO CONCERN |
| | | | | | EQUAL TO OR LARGER THAN 100 AND SMALLER THAN 300 | SMALLER THAN 200 gsm | ARBITRARY | THERE IS NO CONCERN |
| | | | | | | EQUAL TO OR LARGER THAN 200 gsm | ARBITRARY | THERE IS CONCERN |
| | | | | | EQUAL TO OR LARGER THAN 300 | ARBITRARY | ARBITRARY | THERE IS CONCERN |
| | | | | SECOND LUT | SMALLER THAN 200 | ARBITRARY | ARBITRARY | THERE IS NO CONCERN |
| | | | | | EQUAL TO OR LARGER THAN 200 AND SMALLER THAN 500 | SMALLER THAN 200 gsm | ARBITRARY | THERE IS NO CONCERN |
| | | | | | | EQUAL TO OR LARGER THAN 200 gsm | ARBITRARY | THERE IS CONCERN |
| | | | | | EQUAL TO OR LARGER THAN 500 | ARBITRARY | ARBITRARY | THERE IS CONCERN |
| | | | EQUAL TO OR LARGER THAN 500 | ARBITRARY | ARBITRARY | ARBITRARY | ARBITRARY | THERE IS CONCERN |
| | Zone-1 | EQUAL TO OR LARGER THAN 200 gsm | SMALLER THAN 300 | ARBITRARY | ARBITRARY | ARBITRARY | ARBITRARY | THERE IS NO CONCERN |
| | | | EQUAL TO OR LARGER THAN 300 | ARBITRARY | ARBITRARY | ARBITRARY | ARBITRARY | THERE IS CONCERN |
| | Zone-2 | | SMALLER THAN 250 | ARBITRARY | ARBITRARY | ARBITRARY | ARBITRARY | THERE IS NO CONCERN |
| | | | EQUAL TO OR LARGER THAN 250 | ARBITRARY | ARBITRARY | ARBITRARY | ARBITRARY | THERE IS CONCERN |

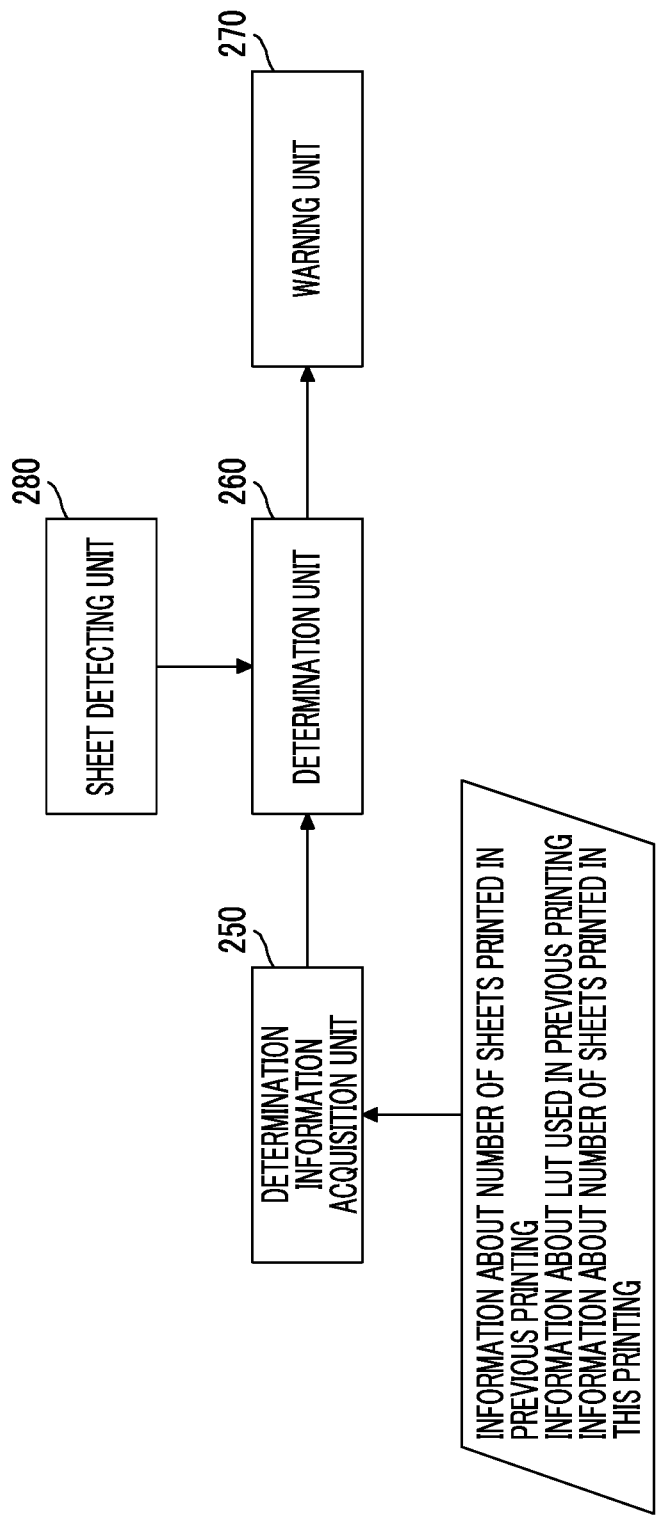

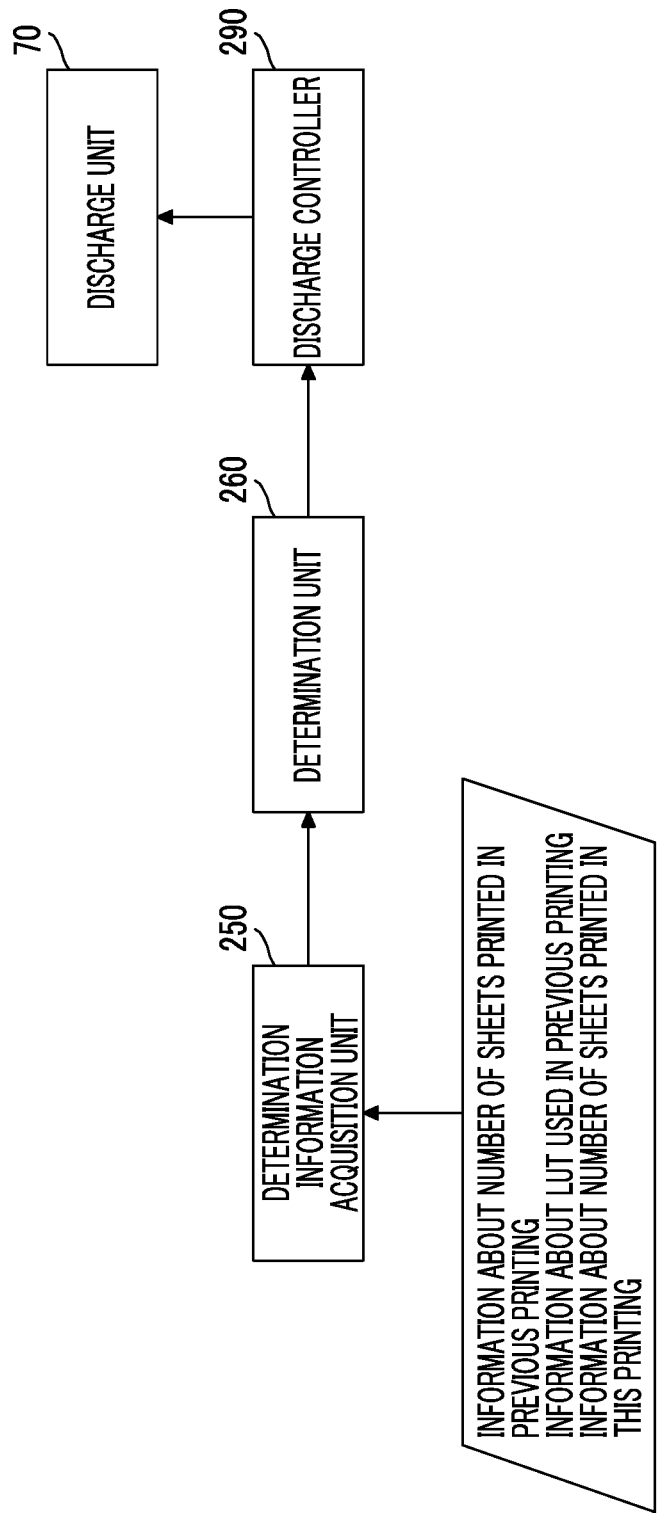

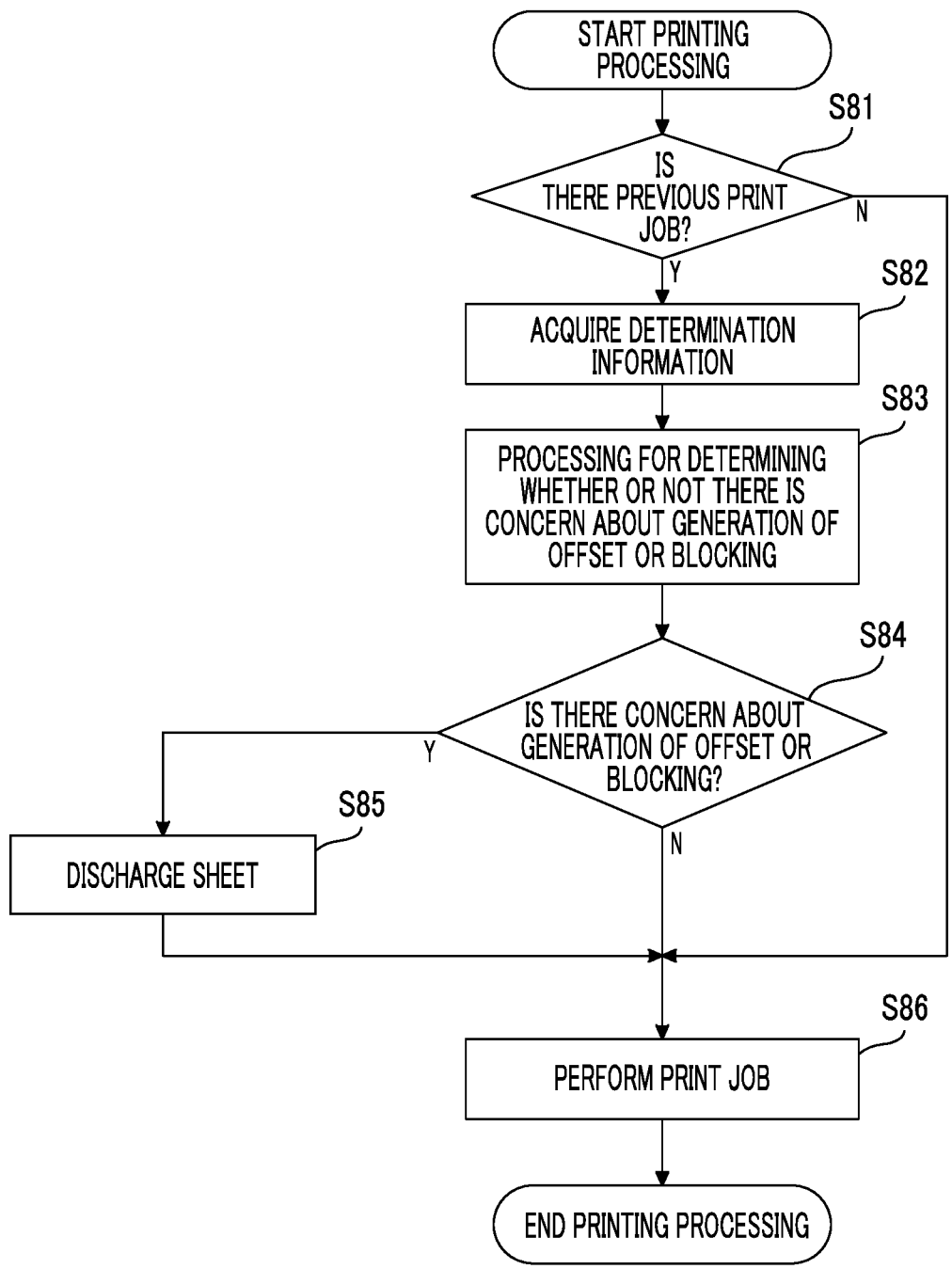

INK JET PRINTING APPARATUS AND COLOR CONVERSION PROCESSING DEVICE

CROSS-REFERENCE TO RELATED APPLICATIONS

The present application claims priority under 35 U.S.C. § 119 to Japanese Patent Application No. 2016-187102, filed on Sep. 26, 2016. The above application is hereby expressly incorporated by reference, in its entirety, into the present application.

BACKGROUND OF THE INVENTION

1. Field of the Invention

The present invention relates to an ink jet printing apparatus and a color conversion processing device, and more particularly, to an ink jet printing apparatus that prints an image with inks having a plurality of colors and a color conversion processing device that converts image data into ink-amount data corresponding to a plurality of colors to print an image by an ink jet printing apparatus printing an image with inks having a plurality of colors.

2. Description of the Related Art

There is a case in which offset, blocking, and the like are generated when a printing apparatus, such as an ink jet printing apparatus recovers sheets having been subjected to printing while stacking the sheets. Offset is a phenomenon in which ink is transferred to the backs of stacked sheets. Blocking is a phenomenon in which stacked sheets stick to each other.

In JP2015-3413A, a method of performing color conversion processing so that a total amount of ink of the surface and back of a sheet is within a prescribed value in the case of duplex printing is proposed as a method of preventing the generation of offset, blocking, and the like.

SUMMARY OF THE INVENTION

However, there is a drawback in that the generation of offset and blocking cannot be appropriately prevented in a case in which the number of printed sheets is increased even though only a total amount of ink is adjusted.

Further, a method of performing color conversion processing with a combination of inks in which a total amount of ink is always small is considered. However, in this case, there is a concern that a deviation may be generated in ink to be used. In a case in which a deviation is generated in ink to be used, turbulence is likely to be generated in the jet in an ink jet head that jets ink frequently used and the clogging of nozzles is likely to occur in an ink jet head that jets ink not frequently used.

The invention has been made in consideration of the above-mentioned circumstances, and an object of the invention is to provide an ink jet printing apparatus and a color conversion processing device that can prevent the generation of offset and blocking and can stably jet ink.

Means for achieving the above-mentioned object are as follows.

(1) An ink jet printing apparatus comprising: a printing section that prints an image on mediums with inks having a plurality of colors by an ink jet method; a collection section that collects the mediums on which the image has been printed by the printing section; an image data acquisition unit that acquires image data to be printed by the printing section; a printed-medium-number information acquisition unit that acquires information about the number of mediums on which the image data acquired by the image data acquisition unit has been printed; a color conversion processing unit that converts the image data into ink-amount data corresponding to the plurality of colors by using a look-up table in which combinations of the amounts of output inks corresponding to input color values are prescribed; a look-up table storage section in which a plurality of look-up tables having different combinations of the amounts of inks are stored; a look-up table selection unit that selects the look-up table, which is used by the color conversion processing unit, from the plurality of look-up tables, which are stored in the look-up table storage section, on the basis of the information about the number of printed mediums acquired by the printed-medium-number information acquisition unit, and selects a look-up table in which a total amount of ink after conversion is smaller as the number of printed mediums is increased; and a print data generation unit that generates print data on the basis of the ink-amount data corresponding to the plurality of colors and generated by the color conversion processing unit.

According to this aspect, since a plurality of look-up tables having different combinations of the amounts of inks are prepared, the look-up tables can be selectively used according to the number of printed mediums. Specifically, a look-up table in which a total amount of ink after conversion is smaller as the number of printed mediums is increased is selected. Accordingly, the generation of offset and blocking can be appropriately prevented. Further, since the deviation of ink to be used can be prevented, all the inks having the colors can be stably jetted.

A look-up table is a table in which combinations of the amounts of output inks corresponding to input color values are prescribed. The combinations of the amounts of output inks can be obtained with reference to the look-up table. As the number of colors of inks to be capable of being used is increased, the degree of freedom in setting a look-up table is increased. "A total amount of ink after conversion" is the sum of the amounts of the respective inks to be combined by conversion.

(2) The ink jet printing apparatus according to (1), wherein each of the plurality of look-up tables stored in the look-up table storage section is set on the basis of a ratio of the amount of a solvent of ink to be combined.

According to this aspect, each look-up table is set on the basis of a ratio of the amount of a solvent of ink to be combined. Since the generation degree of offset and blocking varies depending on a ratio of the amount of a solvent, it is possible to more appropriately prevent the generation of offset and blocking by setting each look-up table in consideration of a ratio of the amount of a solvent of ink to be combined.

(3) The ink jet printing apparatus according to (2), wherein a first look-up table in which a total amount of ink after conversion is large overall, a second look-up table in which a total amount of ink after conversion is small overall, and a third look-up table in which a total amount of ink after conversion is smaller than that in the first look-up table in regard to a specific input color value are stored in the look-up table storage section.

According to this aspect, the first look-up table in which a total amount of ink after conversion is large overall, the second look-up table in which a total amount of ink after conversion is small overall, and the third look-up table in which a total amount of ink after conversion is smaller than that in the first look-up table in regard to a specific input color value are prepared as the look-up tables.

Here, the look-up table in which a total amount of ink after conversion is large overall is a look-up table in which a total amount of ink after conversion is relatively large in a case in which all look-up tables are compared in terms of a total amount of ink after conversion in regard to an input color value. The look-up table in which a total amount of ink after conversion is small overall is a look-up table in which a total amount of ink after conversion is relatively small in a case in which all look-up tables are compared in terms of a total amount of ink after conversion in regard to an input color value. That is, in a case in which multiple amounts of inks can be combined in regard to an input color value, a look-up table which has a combination in which a total amount of ink after conversion is large even in regard to any input color value is a look-up table in which a total amount of ink after conversion is large overall. On the contrary, a look-up table having combinations in which a total amount of ink after conversion is small even in regard to any input color value is a look-up table in which a total amount of ink after conversion is small overall. Since there is also a case in which only one combination is present in some cases of input color values, a total amount of ink after conversion in the first look-up table is the same as a total amount of ink after conversion in the second look-up table in this case. However, in a case in which all look-up tables are compared, a total amount of ink after conversion in the first look-up table is relatively larger than a total amount of ink after conversion in the second look-up table.

Since a total amount of ink after conversion in the third look-up table is smaller than that in the first look-up table in regard to a specific input color value, the third look-up table is an intermediate look-up table in terms of a total amount of ink after conversion. The specific input color value is a color value that allows a combination of inks in which a ratio of the amount of a solvent is high in a case in which a combination of the amounts of inks prescribed in the first look-up table is employed. It is possible to effectively suppress the generation of offset and blocking even in a case in which the number of printed mediums is increased, by making a combination in which a total amount of ink after conversion is reduced in regard to the color value.

(4) The ink jet printing apparatus according to (1) or (2), wherein a first look-up table in which a total amount of ink after conversion is large overall and a second look-up table in which a total amount of ink after conversion is small overall are stored in the look-up table storage section, and the look-up table selection unit compares the number of printed mediums, which is acquired by the printed-medium-number information acquisition unit, with a threshold value, selects the first look-up table in a case in which the number of printed mediums is smaller than the threshold value, and selects the second look-up table in a case in which the number of printed mediums is equal to or larger than the threshold value.

According to this aspect, the first look-up table in which a total amount of ink after conversion is large overall and the second look-up table in which a total amount of ink after conversion is small overall are prepared as the look-up tables. In a case in which the number of printed mediums is smaller than the threshold value, the first look-up table in which a total amount of ink after conversion is large overall is used to perform color conversion processing. On the other hand, in a case in which the number of printed mediums is equal to or larger than the threshold value, the second look-up table in which a total amount of ink after conversion is small overall is used to perform color conversion processing. Accordingly, it is possible to appropriately prevent the generation of offset and blocking regardless of the number of printed mediums. Further, it is possible to prevent specific ink from being non-uniformly used.

(5) The ink jet printing apparatus according to (4), further comprising:

a print information acquisition unit that acquires print information including at least one of information about a printing speed, information about a type of a medium to be used, information about weight of the medium to be used, information about environmental temperature, and information about environmental humidity; and a threshold value setting unit that sets the threshold value on the basis of the print information acquired by the print information acquisition unit.

According to this aspect, the threshold value is set on the basis of a printing speed, the type of a medium to be used, the weight of a medium to be used, environmental temperature, environmental humidity, and the like. Accordingly, it is possible to more appropriately prevent the generation of offset and blocking. That is, since these elements affect offset and blocking, the generation of offset and blocking can be more appropriately prevented in a case in which these elements are added to set the threshold value. Here, as a printing speed is increased, the threshold value is set to be lower. Further, as the type of a medium to be used is closer to a low-permeable sheet, the threshold value is set to be lower. Furthermore, as the weight of a medium to be used is larger, the threshold value is set to be lower. Since the weight of a medium is increased as the thickness of a medium is increased, the weight of a medium can be replaced with the thickness of a medium. That is, the threshold value is set to be lower as the thickness of a medium is increased. Further, as environmental temperature is higher, the threshold value is set to be lower. Furthermore, as environmental humidity is higher, the threshold value is set to be lower.

(6) The ink jet printing apparatus according to (5), wherein the threshold value setting unit sets the threshold value on the basis of print information about image data to be printed in this printing and information about the number of mediums on which image data to be printed next is to be printed, in a case in which the image data to be printed next is already acquired.

According to this aspect, in a case in which the image data to be printed next has been already acquired, the information about the number of mediums on which the image data to be printed next is to be printed is added in addition to the print information about image data to be printed in this printing to set the threshold value. Accordingly, the generation of offset and blocking can be appropriately prevented even in a case in which a plurality of image data are continuously printed.

(7) The ink jet printing apparatus according to (6), wherein the threshold value setting unit sets the threshold value on the basis of print information about image data to be printed in this printing, information about the number of mediums on which image data to be printed next is to be printed, and print information about the image data to be printed next, in a case in which the image data to be printed next is already acquired.

According to this aspect, in a case in which the image data to be printed next has been already acquired, the information about the number of mediums on which the image data to be printed next is to be printed and the print information about the image data to be printed next are added in addition to the print information about image data to be printed in this printing to set the threshold value. Accordingly, the generation of offset and blocking can be more appropriately prevented even in a case in which a plurality of image data are continuously printed.

(8) The ink jet printing apparatus according to (4), further comprising: a threshold value setting unit that sets the threshold value on the basis of information about the number of mediums on which image data to be printed next is to be printed, in a case in which the image data to be printed next is already acquired.

According to this aspect, in a case in which the image data to be printed next has been already acquired, the threshold value is set on the basis of the information about the number of mediums on which the image data to be printed next is to be printed. Accordingly, the generation of offset and blocking can be appropriately prevented even in a case in which a plurality of image data are continuously printed.

(9) The ink jet printing apparatus according to (8), further comprising: a print information acquisition unit that acquires print information including at least one of information about a printing speed, information about a type of a medium to be used, and information about weight of the medium to be used, wherein the threshold value setting unit sets the threshold value on the basis of information about the number of mediums on which image data to be printed next is to be printed and print information about the image data to be printed next, in a case in which the image data to be printed next is already acquired.

According to this aspect, in a case in which the image data to be printed next has been already acquired, the threshold value is set on the basis of the information about the number of mediums on which image data to be printed next is to be printed and the print information about the image data to be printed next. Accordingly, the generation of offset and blocking can be more appropriately prevented even in a case in which a plurality of image data are continuously printed.

(10) The ink jet printing apparatus according to any one of (1) to (9), further comprising: a determination information acquisition unit that acquires information about the number of mediums printed in previous printing, information about a look-up table used in the previous printing, and information about the number of mediums printed in this printing as determination information; a determination unit that determines whether or not there is a concern about the generation of offset and blocking on the basis of the determination information acquired by the determination information acquisition unit; and a warning unit that generates a warning in a case in which the determination unit determines that there is a concern about the generation of offset and blocking.

According to this aspect, the information about the number of mediums printed in the previous printing, the information about a look-up table used in the previous printing, and the information about the number of mediums printed in this printing are acquired as determination information, and it is determined whether or not there is a concern about the generation of offset and blocking on the basis of the obtained determination information. Then, a warning is generated in a case in which it is determined that there is a concern about the generation of offset and blocking. Accordingly, the generation of offset and blocking can be prevented in advance even in a case in which a plurality of image data are continuously printed.

(11) The ink jet printing apparatus according to (10), wherein the determination information acquired by the determination information acquisition unit further includes at least one of information about a printing speed in the previous printing, information about the type of a medium used in the previous printing, information about the weight of the medium used in the previous printing, information about environmental temperature in the previous printing, information about environmental humidity in the previous printing, information about a printing speed in this printing, and information about the weight of a medium used in this printing.

According to this aspect, the information about a printing speed in the previous printing, the information about the type of a medium used in the previous printing, the information about the weight of the medium used in the previous printing, the information about environmental temperature in the previous printing, the information about environmental humidity in the previous printing, the information about a printing speed in this printing, the information about the weight of a medium to be used in this printing, and the like are further used to determine whether or not there is a concern about the generation of offset and blocking. Accordingly, it is possible to more accurately determine whether or not there is a concern about the generation of offset and blocking.

(12) The ink jet printing apparatus according to (10) or (11), further comprising: a medium detecting unit that detects whether or not there is a medium present in the collection section, wherein the determination unit performs determination processing only in a case in which a medium is detected by the medium detecting unit.

According to this aspect, it is detected whether or not a medium remains in the collection section, and it is determined whether or not there is a concern about the generation of offset and blocking only in a case in which a medium is detected. Accordingly, a print job can be performed efficiently.

(13) The ink jet printing apparatus according to (12), wherein the warning unit generates a warning again in a case in which a medium is detected by the medium detecting unit after a predetermined time has passed from the generation of the warning.

According to this aspect, in a case in which a medium remains in the collection section even though a predetermined time has passed from the generation of a warning, a warning is generated again. Accordingly, it is possible to more reliably call operator's attention.

(14) The ink jet printing apparatus according to any one of (1) to (9), further comprising: a discharge unit that discharges the mediums collected in the collection section; a determination information acquisition unit that acquires information about the number of mediums printed in previous printing, information about a look-up table used in the previous printing, and information about the number of mediums printed in this printing as determination information; a determination unit that determines whether or not there is a concern about the generation of offset and blocking on the basis of the determination information acquired by the determination information acquisition unit; and a discharge controller that discharges the mediums collected in the collection section by operating the discharge unit in a case in which the determination unit determines that there is a concern about the generation of offset and blocking.

According to this aspect, the discharge unit that discharges the mediums collected in the collection section is provided. In a case in which it is determined that there is a concern about the generation of offset and blocking, the discharge unit is operated and the mediums collected in the collection section are automatically discharged. Accordingly, the generation of offset and blocking can be appropriately prevented even in a case in which a plurality of image data are continuously printed.

(15) The ink jet printing apparatus according to (14), wherein the determination information acquired by the determination information acquisition unit further includes at least one of information about a printing speed in the previous printing, information about the type of a medium used in the previous printing, information about the weight of the medium used in the previous printing, information about environmental temperature in the previous printing, information about environmental humidity in the previous printing, information about a printing speed in this printing, and information about the weight of a medium used in this printing.

According to this aspect, information, such as the information about a printing speed in the previous printing, the information about the type of a medium used in the previous printing, the information about the weight of the medium used in the previous printing, the information about environmental temperature in the previous printing, the information about environmental humidity in the previous printing, the information about a printing speed in this printing, and the information about the weight of a medium used in this printing, is further used to determine whether or not there is a concern about the generation of offset and blocking. Accordingly, it is possible to more accurately determine whether or not there is a concern about the generation of offset and blocking.

(16) A color conversion processing device comprising: an image data acquisition unit that acquires image data to be printed by an ink jet printing apparatus; a printed-medium-number information acquisition unit that acquires information about the number of mediums on which the image data acquired by the image data acquisition unit has been printed; a color conversion processing unit that converts the image data into ink-amount data corresponding to the plurality of colors by using a look-up table in which combinations of the amounts of output inks corresponding to input color values are prescribed; a look-up table storage section in which a plurality of look-up tables having different combinations of the amounts of inks are stored; and a look-up table selection unit that selects the look-up table, which is used by the color conversion processing unit, from the plurality of look-up tables, which are stored in the look-up table storage section, on the basis of the information about the number of printed mediums acquired by the printed-medium-number information acquisition unit, and selects a look-up table in which a total amount of ink after conversion is smaller as the number of printed mediums is increased.

According to this aspect, since a plurality of look-up tables having different combinations of the amounts of inks are prepared, the look-up tables can be selectively used according to the number of printed mediums. Specifically, a look-up table in which a total amount of ink after conversion is smaller as the number of printed mediums is increased is selected and used. Accordingly, the generation of offset and blocking can be appropriately prevented. Further, since the deviation of ink to be used can be prevented, all the inks having the colors can be stably jetted.

(17) The color conversion processing device according to (16), wherein each of the plurality of look-up tables stored in the look-up table storage section is set on the basis of a ratio of the amount of a solvent of ink to be combined.

According to this aspect, each look-up table is set on the basis of a ratio of the amount of a solvent of ink to be combined. Since the generation degree of offset and blocking varies depending on a ratio of the amount of a solvent, it is possible to more appropriately prevent the generation of offset and blocking by setting each look-up table in consideration of a ratio of the amount of a solvent of ink to be combined.

(18) The color conversion processing device according to (17), wherein a first look-up table in which a total amount of ink after conversion is large overall, a second look-up table in which a total amount of ink after conversion is small overall, and a third look-up table in which a total amount of ink after conversion is smaller than that in the first look-up table in regard to a specific input color value are stored in the look-up table storage section.

According to this aspect, the first look-up table in which a total amount of ink after conversion is large overall, the second look-up table in which a total amount of ink after conversion is small overall, and the third look-up table in which a total amount of ink after conversion is smaller than that in the first look-up table in regard to a specific input color value are prepared as the look-up tables. Since a total amount of ink after conversion in the third look-up table is smaller than that in the first look-up table in regard to a specific input color value, the third look-up table is an intermediate look-up table in terms of a total amount of ink after conversion. The specific input color value is a color value that allows a combination of inks in which a ratio of the amount of a solvent is high in a case in which a combination of the amounts of inks prescribed in the first look-up table is employed. It is possible to effectively suppress the generation of offset and blocking even in a case in which the number of printed mediums is increased, by making a combination in which a total amount of ink after conversion is reduced in regard to the color value.

(19) The color conversion processing device according to (16) or (17), wherein a first look-up table in which a total amount of ink after conversion is large overall and a second look-up table in which a total amount of ink after conversion is small overall are stored in the look-up table storage section, and the look-up table selection unit compares the number of printed mediums, which is acquired by the printed-medium-number information acquisition unit, with a threshold value, selects the first look-up table in a case in which the number of printed mediums is smaller than the threshold value, and selects the second look-up table in a case in which the number of printed mediums is equal to or larger than the threshold value.

According to this aspect, the first look-up table in which a total amount of ink after conversion is large overall and the second look-up table in which a total amount of ink after conversion is small overall are prepared as the look-up tables. In a case in which the number of printed mediums is smaller than the threshold value, the first look-up table in which a total amount of ink after conversion is large overall is used to perform color conversion processing. On the other hand, in a case in which the number of printed mediums is equal to or larger than the threshold value, the second look-up table in which a total amount of ink after conversion is small overall is used to perform color conversion processing. Accordingly, it is possible to appropriately prevent the generation of offset and blocking regardless of the number of printed mediums. Further, it is possible to prevent specific ink from being non-uniformly used.

(20) The color conversion processing device according to (19), further comprising: a print information acquisition unit that acquires print information including at least one of information about a printing speed, information about a type of a medium to be used, information about weight of the medium to be used, information about environmental temperature, and information about environmental humidity; and a threshold value setting unit that sets the threshold value on the basis of the print information acquired by the print information acquisition unit.

According to this aspect, the threshold value is set on the basis of a printing speed, the type of a medium to be used, the weight of a medium to be used, environmental temperature, environmental humidity, and the like. Accordingly, it is possible to more appropriately prevent the generation of offset and blocking. That is, since these elements affect offset and blocking, the generation of offset and blocking can be more appropriately prevented in a case in which these elements are added to set the threshold value.

According to the invention, it is possible to prevent the generation of offset and blocking and to stably jet ink.

BRIEF DESCRIPTION OF THE DRAWINGS

FIG. 5 is a diagram showing examples of a first LUT and a second LUT.

FIG. 8 is a block diagram of a function to perform processing for selecting a LUT.

FIG. 9 is a diagram showing an example of a threshold value setting table.

FIG. 10 is a graph showing classification criteria for environmental temperature/humidity.

FIG. 11 is a flow chart showing a procedure of processing for selecting a LUT that includes processing for setting a threshold value.

FIG. 12 is a table showing examples of a first combination α and a second combination β in regard to each input color value.

FIG. 13 is a diagram showing examples of a first LUT, a second LUT, and a third LUT.

FIG. 18 is a diagram showing an example of a table in a case in which other information is also used to determine whether or not there is a concern about the generation of offset and blocking.

FIG. 19 is a block diagram of configuration relating to the determination of whether or not there is a concern about the generation of offset and blocking.

FIG. 22 is a functional block diagram of configuration relating to the automatic discharge of sheets.

FIG. 23 is a flow chart showing a procedure of printing processing.

DESCRIPTION OF THE PREFERRED EMBODIMENTS

Preferred embodiments of the invention will be described in detail below with reference to the accompanying drawings.

First Embodiment

<<Structure of Ink Jet Printing Apparatus>>

Figure 1:
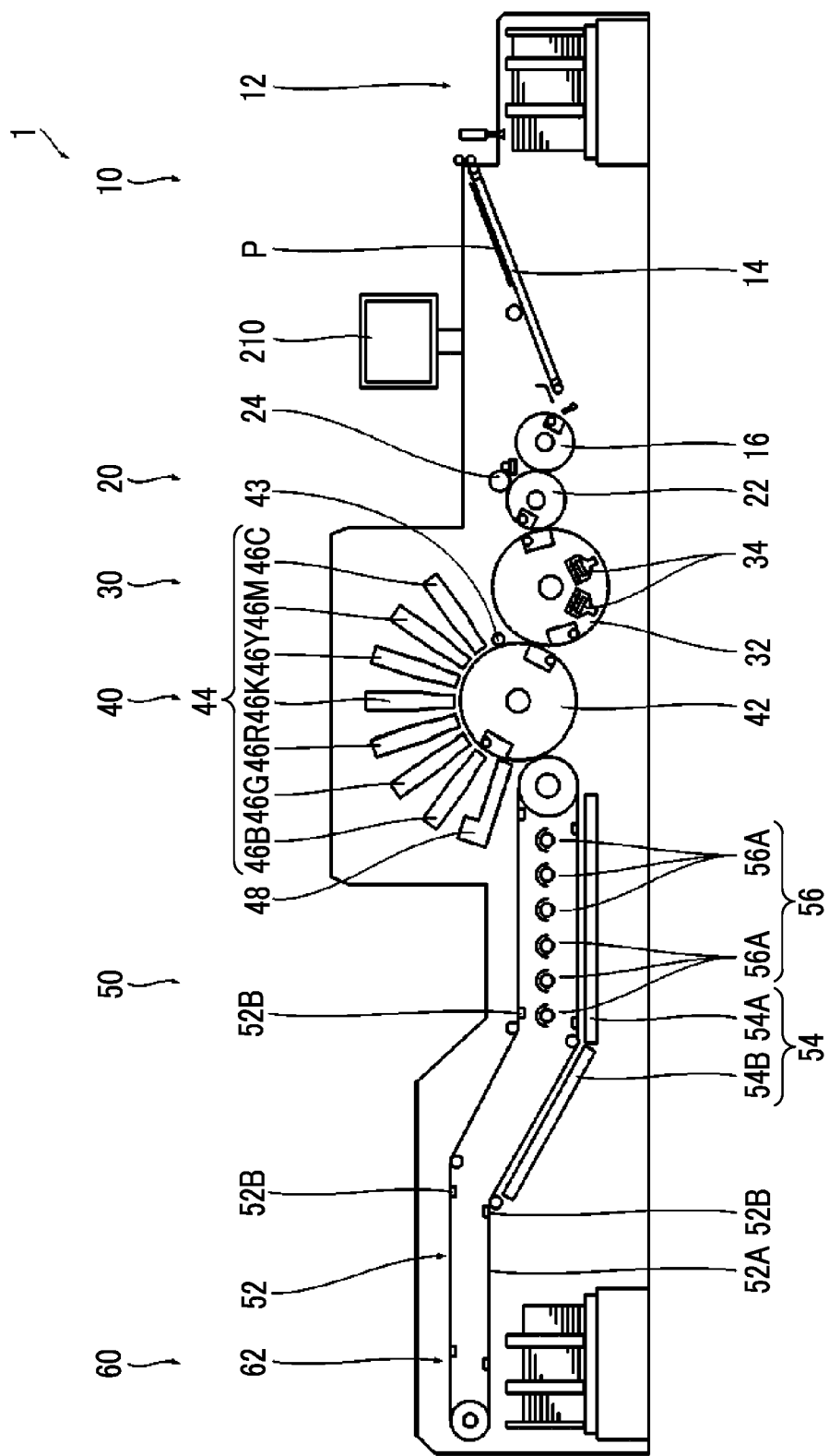
FIG. 1 is a diagram showing the entire structure of an ink jet printing apparatus according to an embodiment.

FIG. 1 is a diagram showing the entire structure of an ink jet printing apparatus according to an embodiment of the invention.

The ink jet printing apparatus 1 shown in FIG. 1 is a sheet-type color ink jet printing apparatus that prints a desired image on a sheet as a sheet of paper with inks having seven colors of cyan (C), magenta (M), yellow (Y), black (K), red (R), green (G), and blue (B) by a single pass. Particularly, the ink jet printing apparatus 1 of this embodiment is an ink jet printing apparatus that prints an image on a general-purpose printing sheet with aqueous ink.

Here, the ink jet printing apparatus is a printing apparatus that prints an image by an ink jet method. The ink jet method means a marking method that includes separating ink in the form of liquid droplets, jetting the ink to a medium according to image signals, and making color materials adhere to the medium.

Further, the single pass means a method of completely printing an image on a sheet, which is being transported, in one shot while fixing an ink jet head at a certain position. The single pass is also referred to as one pass.

Furthermore, the general-purpose printing sheet does not mean so-called exclusive paper for an ink jet method and means a sheet, which uses cellulose as a main component, such as coated paper generally used in an offset printing machine and the like. For example, the general-purpose printing sheet includes art paper, coated paper, lightweight coated paper, cast paper, fine coated paper, and the like.

Further, the aqueous ink means ink in which a color material, such as dye or a pigment, is dissolved or dispersed in water and a solvent soluble in water.

As shown in FIG. 1, the ink jet printing apparatus 1 mainly includes: a sheet feeding section 10 that feeds a sheet P; a treatment liquid applying section 20 that applies treatment liquid to the sheet P fed from the sheet feeding section 10; a treatment liquid drying section 30 that performs processing for drying the sheet P to which the treatment liquid has been applied; a printing section 40 that prints a color image on the sheet P, which has been subjected to drying processing, by jetting ink droplets having the respective colors of cyan, magenta, yellow, and black to the sheet P; an ink drying section 50 that performs processing for drying the sheet P to which the ink droplets have been jetted; and a collection section 60 that collects the sheet P having been subjected to drying processing.

<Sheet Feeding Section>

The sheet feeding section 10 feeds a sheet P that is a medium. The sheet P is a sheet of paper. The sheet feeding section 10 mainly includes a sheet feeding device 12, a feeder board 14, and a sheet feeding drum 16.

The sheet feeding device 12 sequentially takes out sheets P, which are set on a tray in the form of a bundle, from the top of the bundle one by one and feeds the sheets P to the feeder board 14.

The sheet feeding device 12 is provided with a blower (not shown) to stably feed sheets. The blower blows air to the bundle of sheets to separate the sheets P. Since the flow rate of air to be blown from the blower can be adjusted, the flow rate of air is adjusted as necessary.

The feeder board 14 is means for transporting a sheet P, and receives the sheet P fed from the sheet feeding device 12 and transports the sheet P to the sheet feeding drum 16.

The sheet feeding drum 16 is means for transporting a sheet P, and receives the sheet P from the feeder board 14 and transports the sheet P to the treatment liquid applying section 20. The sheet feeding drum 16 transports the sheet P while winding the sheet P around the peripheral surface thereof by rotating while gripping a front end of the sheet P by a gripper provided on the peripheral surface of the sheet feeding drum 16.

The sheet feeding section 10 has the above-mentioned structure. Sheets P are fed to the feeder board 14 from the sheet feeding device 12 one by one, and are fed to the sheet feeding drum 16 by the feeder board 14. Then, the sheets P are transported to the treatment liquid applying section 20 by the sheet feeding drum 16.

<Treatment Liquid Applying Section>

The treatment liquid applying section 20 applies treatment liquid to the sheet P. The treatment liquid is formed of liquid having a function to allow a color material component, which is contained in ink, to aggregate, to insolubilize the color material component, or to thicken the color material component. Since the treatment liquid is applied to the sheet P, a high-quality image can be printed even in a case in which an image is printed on a general-purpose printing sheet with aqueous ink.

The treatment liquid applying section 20 mainly includes a treatment liquid applying drum 22 that transports a sheet P, and a treatment liquid applying device 24 that applies treatment liquid to the printing surface of the sheet P transported by the treatment liquid applying drum 22.

The treatment liquid applying drum 22 is means for transporting a sheet P in the treatment liquid applying section 20, and receives the sheet P from the sheet feeding drum 16 and transports the received sheet P to the treatment liquid drying section 30. The treatment liquid applying drum 22 transports the sheet P while winding the sheet P around the peripheral surface thereof by rotating while gripping the front end of the sheet P by a gripper provided on the peripheral surface of the treatment liquid applying drum 22.

The treatment liquid applying device 24 is means for applying treatment liquid, and applies the treatment liquid to the sheet P, which is to be transported, by the treatment liquid applying drum 22. In this embodiment, the treatment liquid applying device 24 applies the treatment liquid to the sheet P by a roller. That is, the treatment liquid applying device 24 presses a roller, which the treatment liquid is applied to the peripheral surface thereof, against the sheet P transported by the treatment liquid applying drum 22 to apply the treatment liquid to the sheet P. A method of applying treatment liquid is not limited thereto, and a method of applying treatment liquid by an ink jet head, a method of applying treatment liquid by a spray, and the like can also be employed as the method of applying treatment liquid.

The treatment liquid applying section 20 has the above-mentioned structure. While a sheet P is transported by the treatment liquid applying drum 22, treatment liquid is applied to the sheet P by the treatment liquid applying device 24.

<Treatment Liquid Drying Section>

The treatment liquid drying section 30 performs processing for drying the sheets P to which treatment liquid has been applied. The treatment liquid drying section 30 mainly includes a treatment liquid drying drum 32 that transports sheets P, and treatment liquid drying devices 34 that blow hot air to the sheets P transported by the treatment liquid drying drum 32 to dry the sheets P.

The treatment liquid drying drum 32 is means for transporting sheets P in the treatment liquid drying section 30, and receives the sheets P from the treatment liquid applying drum 22 of the treatment liquid applying section 20 and transports the sheets P to the printing section 40. The treatment liquid drying drum 32 is formed of a frame body formed in a cylindrical shape, and transports the sheets P while winding the sheets P around the peripheral surface thereof by rotating while gripping front ends of the sheets P by grippers provided on the peripheral surface of the treatment liquid drying drum 32.

The treatment liquid drying devices 34 are installed in the treatment liquid drying drum 32, and send hot air to the sheets P transported by the treatment liquid drying drum 32.

The treatment liquid drying section 30 has the above-mentioned structure. While sheets P are transported by the treatment liquid drying drum 32, hot air is blown to the sheets P from the treatment liquid drying devices 34 and the sheets P are subjected to drying processing.

<Printing Section>

The printing section 40 prints a color image on the printing surface of the sheet P with inks having seven colors of cyan (C), magenta (M), yellow (Y), black (K), red (R), green (G), and blue (B).

The printing section 40 mainly includes: a printing drum 42 that transports sheets P; a sheet pressing roller 43 that presses the sheet P transported by the printing drum 42 against the printing drum 42; a printing unit 44 that prints an image on the sheet P transported by the printing drum 42 with inks having seven colors of cyan (C), magenta (M), yellow (Y), black (K), red (R), green (G), and blue (B) by an ink jet method; and an image reading device 48 that reads the image printed on the sheet P.

The printing drum 42 is means for transporting sheets P in the printing section 40, and receives the sheets P from the treatment liquid drying drum 32 of the treatment liquid drying section 30 and transports the sheets P to the ink drying section 50. The printing drum 42 transports the sheets P while winding the sheets P around the peripheral surface thereof by rotating while gripping front ends of the sheets P by grippers provided on the peripheral surface of the printing drum 42. The printing drum 42 is provided with a suction mechanism (not shown) to particularly ensure close contact between the sheet P and itself. The suction mechanism employs a method using negative pressure, a method using static electricity, and the like. In the method using negative pressure, small holes are formed on the peripheral surface of a drum and a sheet is made to be in close contact with the peripheral surface of the drum by the suction of air from the inside of the drum. In the method using static electricity, a sheet is made to be in close contact with the peripheral surface of the drum by the electrification of the peripheral surface of the drum.

The sheet pressing roller 43 is disposed on the transport path of a sheet P that is transported by the printing drum 42. Particularly, the sheet pressing roller 43 is disposed on the upstream side of the printing unit 44 in the transport direction of the sheet P. The sheet pressing roller 43 is means for pressing a sheet P, and presses the sheet P, which is transported by the printing drum 42, against the printing drum 42 to make the sheet P be in close contact with the peripheral surface of the printing drum 42.

The printing unit 44 is disposed on the transport path of a sheet P that is transported by the printing drum 42. The printing unit 44 includes an ink jet head 46C that jets ink droplets having a cyan (C) color, an ink jet head 46M that jets ink droplets having a magenta (M) color, an ink jet head 46Y that jets ink droplets having a yellow (Y) color, an ink jet head 46K that jets ink droplets having a black (K) color, an ink jet head 46R that jets ink droplets having a red (R) color, an ink jet head 46G that jets ink droplets having a green (G) color, and an ink jet head 46B that jets ink droplets having a blue (B) color. The respective ink jet heads 46C, 46M, 46Y, 46K, 46R, 46G, and 46B are mounted on a carriage (not shown), and are integrated with the carriage.

Each of the ink jet heads 46C, 46M, 46Y, 46K, 46R, 46G, and 46B is formed of a line head that can print an image on the sheet P transported by the printing drum 42 by a single pass.

The respective ink jet heads 46C, 46M, 46Y, 46K, 46R, 46G, and 46B are mounted on the carriage (not shown), so that the respective ink jet heads are disposed orthogonal to the transport direction of the sheet P.

Further, the respective ink jet heads 46C, 46M, 46Y, 46K, 46R, 46G, and 46B are mounted on the carriage (not shown), so that the ink jet heads are arranged at regular intervals in the transport direction of the sheet P. In the embodiment shown in FIG. 1, the respective ink jet heads 46C, 46M, 46Y, 46K, 46R, 46G, and 46B are arranged at regular intervals in the order of cyan, magenta, yellow, black, red, green, and blue from the upstream side in the transport direction of the sheet P.

The carriage (not shown) is provided so as to be movable in a direction parallel to the axis of rotation of the printing drum 42. Accordingly, the printing unit 44 can be retreated from the printing drum by the movement of the carriage.

Each of the ink jet heads 46C, 46M, 46Y, 46K, 46R, 46G, and 46B mounted on the carriage (not shown) is disposed so that a nozzle surface provided on the tip of each ink jet head faces the peripheral surface of the printing drum 42. A plurality of nozzles are disposed on the nozzle surface, and ink droplets are jetted to the sheet P from the nozzles. For example, the nozzles are disposed in the form of a matrix. Since the nozzles are disposed in the form of a matrix, the nozzles can be densely disposed in comparison with a case in which nozzles are disposed in line.

The image reading device 48 is disposed on the transport path of a sheet P that is transported by the printing drum 42. The image reading device 48 is disposed on the downstream side of the printing unit 44 in the transport direction of the sheet P to read the results of printing that is performed by the printing unit 44. The image reading device 48 is formed of a line scanner, and reads the sheet, which is transported by the printing drum 42, line by line.

The printing section 40 has the above-mentioned structure. While the sheet P is transported by the printing drum 42, ink droplets having the respective colors of C, M, Y, K, R, G, and B are jetted to the printing surface from the respective ink jet heads 46C, 46M, 46Y, 46K, 46R, 46G, and 46B of the printing unit 44 and an image is printed on the printing surface. The printed image is read by the image reading device 48 as necessary.

<Ink Drying Section>

The ink drying section 50 performs processing for drying the sheet P having been subjected to printing. The ink drying section 50 mainly includes a chain gripper 52 that transports sheets P, a sheet guide 54 that guides the travel of the sheets P transported by the chain gripper 52, and a heating-drying device 56 that heats the printing surfaces of the sheets P transported by the chain gripper 52 to dry the printing surfaces of the sheets P.

The chain gripper 52 is means for transporting the sheets P having been subjected to printing, and receives the sheets P from the printing drum 42 and transports the sheets P to the collection section 60. The chain gripper 52 includes an endless chain 52A that travels along a certain travel path, and grips front ends of the sheets P by grippers 52B provided on a chain 52A of the chain gripper 52 and transports the sheets P. Since the sheets P are transported by the chain gripper 52, the sheets P pass through a heating region and a non-heating region set in the ink drying section 50 and are transported to the collection section 60. The heating region is set to a region where the sheet P transported from the printing section 40 is horizontally transported for the first time, and the non-heating region is set to a region where the sheet P is transported while being inclined.

The sheet guide 54 guides the transport of the sheet P in the heating region and the non-heating region. The sheet guide 54 includes a first guide board 54A that guides the transport of the sheet P in the heating region and a second guide board 54B that guides the transport of the sheet P in the non-heating region. Each of the first and second guide boards 54A and 54B includes a guide surface, and guides the transport of the sheet P by allowing the sheet P to slide on the guide surface. At this time, the first and second guide boards 54A and 54B suck the sheet P. Accordingly, tension can be applied to the sheet P that is being transported. Negative pressure is used for suction. The first and second guide boards 54A and 54B includes a plurality of suction holes formed on the guide surfaces thereof, and make the sheet P be sucked by sucking air through the suction holes.

The heating-drying device 56 is installed in the heating region, and dries ink applied to the sheet P by heating the sheet P that is being transported in the heating region. The heating-drying device 56 includes a plurality of infrared lamps 56A as a heat source, and is disposed in the chain gripper 52. The infrared lamps 56A are arranged at regular intervals along the transport path of the sheet P in the heating region.

The ink drying section 50 has the above-mentioned structure. While the sheet P having been subjected to printing is transported by the chain gripper 52, the sheet P is heated by the heating-drying device 56 and is subjected to drying processing.

<Collection Section>

The collection section 60 is a recovery section for the sheets P having been subjected to printing, and recovers sheets P that are sequentially discharged while stacking the sheets P. The collection section 60 includes a stacker 62. The stacker 62 stacks sheets P, which are sequentially discharged, on a tray while aligning the sheets P.

In a case in which a sheet P is transported to a certain position by the chain gripper 52, the grip of the sheet P performed by the gripper 52B is cancelled and the sheet P is released from the chain gripper 52. That is, the sheet P is discharged. The collection section 60 receives the discharged sheet P and recovers the sheet P while stacking the sheet P on the tray.

<<Flow of the Entire Processing Performed by Ink Jet Printing Apparatus>>

In the ink jet printing apparatus 1 of this embodiment, sheets P are subjected to processing in the order of the application of treatment liquid, the drying of the treatment liquid, printing, and the drying of ink. Sheets P are sequentially fed from the sheet feeding section 10 one by one at regular intervals.

The sheets P, which are fed from the sheet feeding section 10, are transported to the treatment liquid applying section 20 first. Then, while the sheets P are transported by the treatment liquid applying drum 22 of the treatment liquid applying section 20, treatment liquid is applied to the printing surfaces of the sheets P.

Next, the sheets P to which the treatment liquid has been applied are transported to the treatment liquid drying section 30. Then, while the sheets P are transported by the treatment liquid drying drum 32 of the treatment liquid drying section 30, hot air is blown to the printing surfaces of the sheets P and the sheets P are subjected to drying processing.

Next, the sheets P, which have been subjected to drying processing, are transported to the printing section 40. Then, while the sheets P are transported by the printing drum 42 of the printing section 40, inks having the respective colors of cyan, magenta, yellow, black, red, green, and blue are jetted to the printing surfaces of the sheets P and images are printed on the printing surface.

Next, the sheets P on which the images have been printed are transported to the ink drying section 50. Then, while the sheets P are transported by the chain gripper 52 of the ink drying section 50, hot air is blown to the printing surfaces of the sheets P and the sheets P are subjected to drying processing.

The sheets P, which have been subjected to drying processing, are transported to the collection section 60 by the chain gripper 52 as they are, and are recovered while being stacked by the stacker 62 one by one.

<<Control System of Ink Jet Printing Apparatus>>
<Overall Control>

Figure 2:
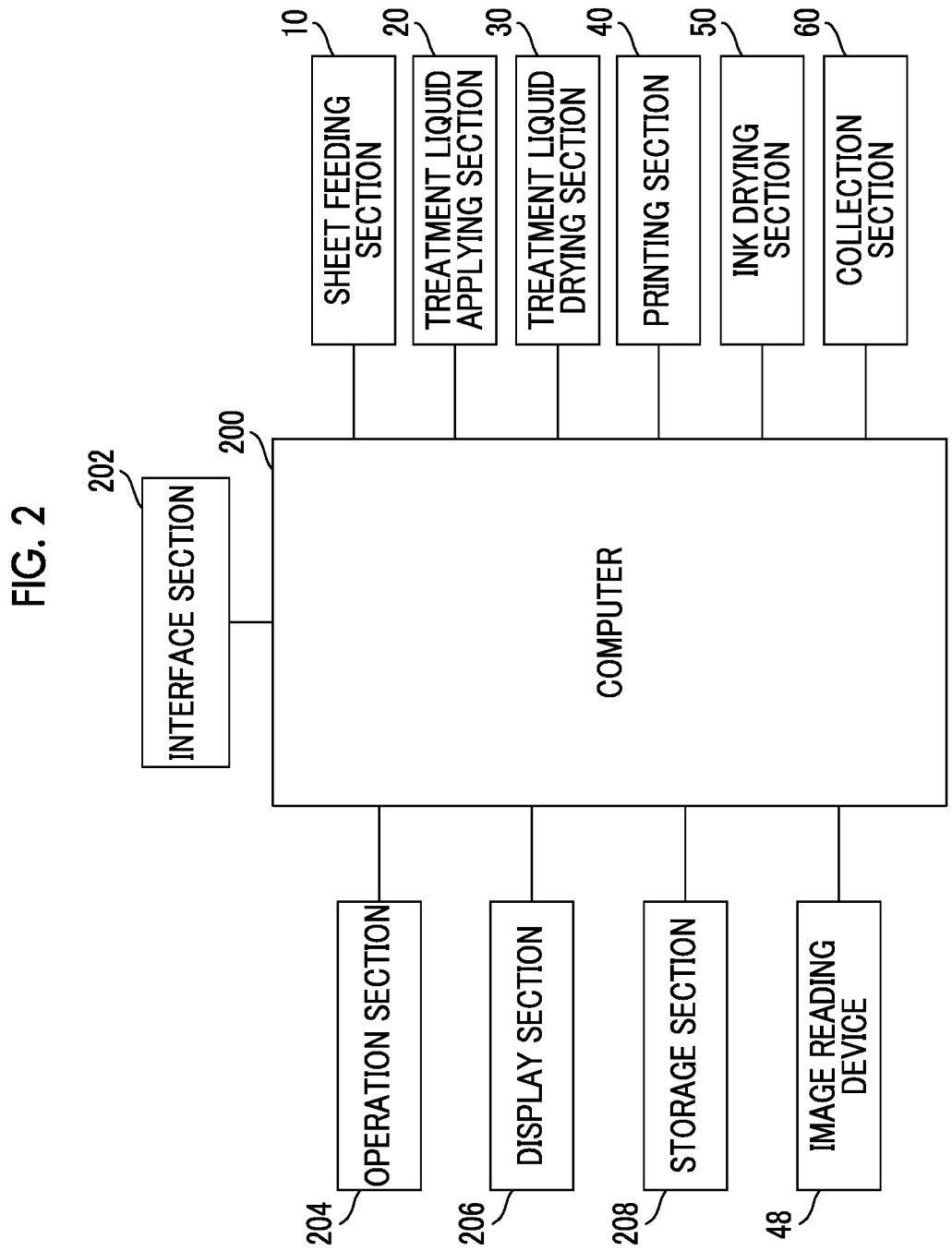
FIG. 2 is a block diagram showing the schematic configuration of a control system of the ink jet printing apparatus.

FIG. 2 is a block diagram showing the schematic configuration of a control system of the ink jet printing apparatus.

The entire operation of the ink jet printing apparatus 1 is generally controlled by a computer 200 that is a controller. That is, all the processing, such as the feed of a sheet performed by the sheet feeding section 10, the application of treatment liquid performed by the treatment liquid applying section 20, the drying of treatment liquid performed by the treatment liquid drying section 30, printing performed by the printing section 40, the drying of ink performed by the ink drying section 50, and collection performed by the collection section 60, is controlled by the computer 200. The computer 200 functions as means for controlling each section by executing a predetermined control program.

An interface section 202 that is used to connect an external device, an operation section 204 that is used to operate the ink jet printing apparatus 1, a display section 206 that is used to display various types of information, and a storage section 208 that is used to store various types of information are connected to the computer 200.

Image data, which is to be printed by the ink jet printing apparatus 1, is acquired from the external device through the interface section 202 as a print job together with the information about the number of printed sheets. Accordingly, the interface section 202 functions as an image data acquisition unit and a printed-sheet-number information acquisition unit. Image data is expressed, for example, as an RGB format having 256 gradations (8 bits, the maximum value of 255).

The image data acquired as a print job and the information about the number of printed sheets are temporarily stored in the storage section 208. After that, the image data is subjected to predetermined data processing and is converted into a data format that can be printed by the printing section 40. In a case in which a plurality of print jobs are continuously acquired, the print jobs are sequentially stored in the storage section 208 and are processed in turn.

The storage section 208 is formed of, for example, a hard disk drive. Various programs executed by the computer 200 and various data required for control are stored in the storage section 208. A plurality of look-up tables are stored in the storage section 208 as described below. Accordingly, the storage section 208 functions as a look-up table storage section.

The operation section 204 includes a touch panel 210 as one of operation means (see FIG. 1). The touch panel 210 also functions as the display section 206, and various types of information are displayed on the display screen of the touch panel 210. A warning is also included in the information displayed on the display screen of the touch panel 210 as described below.

<Data Processing>

The image data is converted into a data format that can be printed by the printing section 40 as described above. This processing is performed by the computer 200. The computer 200 functions as a data processing section 220 by executing a predetermined program.

Figure 3:
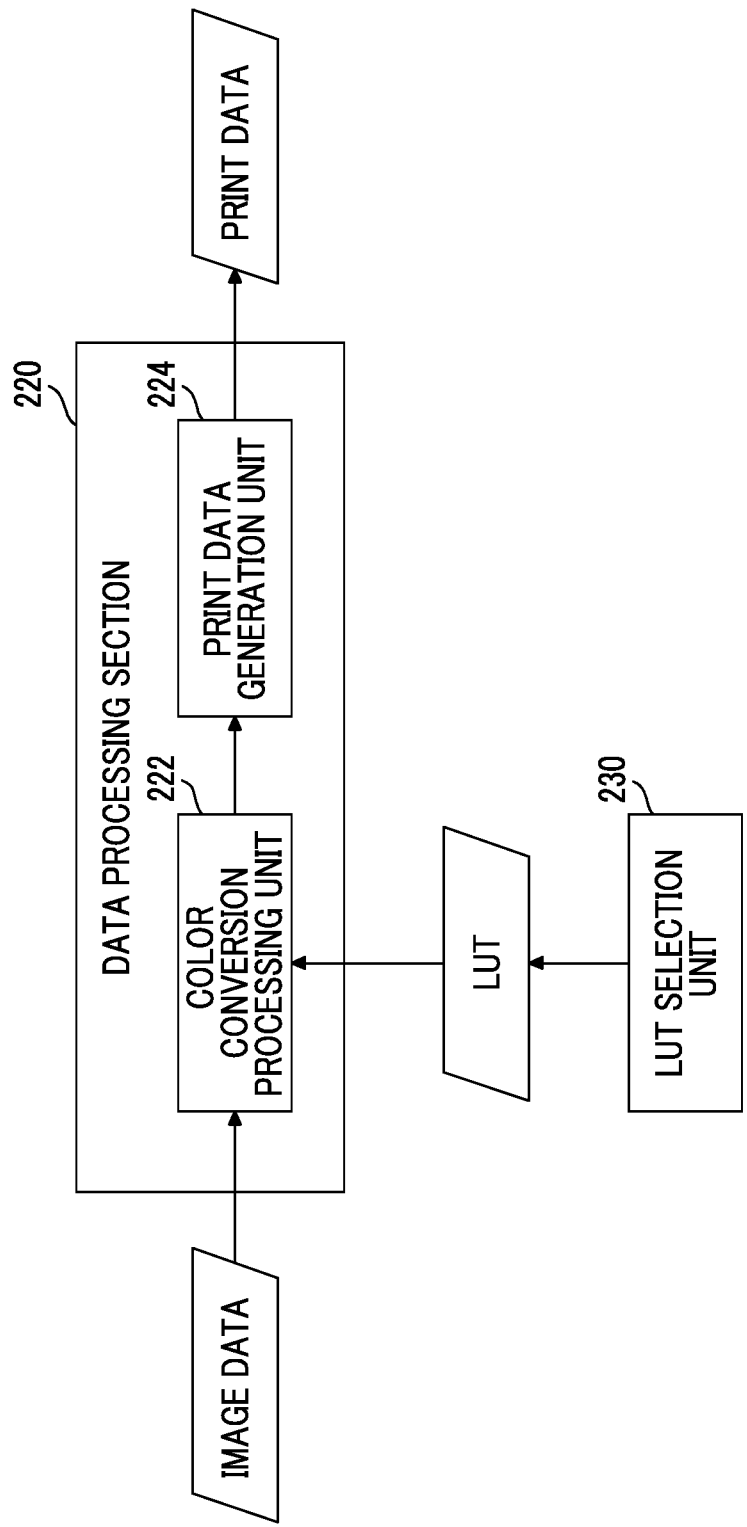
FIG. 3 is a block diagram of functions that are provided by a data processing section.

FIG. 3 is a block diagram of functions that are provided by the data processing section.

As shown in FIG. 3, the data processing section 220 includes a color conversion processing unit 222 that performs color conversion processing on the image data, and a print data generation unit 224 that generates print data from ink-amount data obtained through conversion processing.

[Color Conversion Processing Unit]

The color conversion processing is processing for converting image data, which is expressed as an RGB format, into ink-amount data corresponding to the respective colors. Since the ink jet printing apparatus 1 of this embodiment uses inks having seven colors of cyan, magenta, yellow, black, red, green, and blue, processing for converting image data into ink-amount data corresponding to the seven colors is performed.

A look-up table is used in the color conversion processing (hereinafter, the look-up table is abbreviated as "LUT"). A LUT is a table in which combinations of the amounts of output inks corresponding to input color values are prescribed in advance.

The color conversion processing unit 222 obtains combinations of the amounts of inks, which correspond to an input color value (an input RGB value), with reference to a LUT.

Since a plurality of LUTs are prepared, a LUT to be used is switched according to the number of printed sheets. This processing will be described in detail below.

[Print Data Generation Unit]

The print data is data having a format that can be processed by the printing section 40 for printing an image by an ink jet method. In this embodiment, the print data is dot arrangement data that is expressed by ON/OFF of dots having the respective colors. Here, ON of dots may include multiple types of dots having different sizes (for example, large dots, medium dots, and small dots). That is, the dot arrangement data is data of a M value in a case in which M is a positive integer equal to or larger than 2 (for example, M is 4 in the case of large dots, medium dots, small dots, and OFF of dots).

For example, the dot arrangement data is generated in a case in which halftoning is performed on the ink-amount data obtained through the color conversion processing.

The print data generation unit 224 acquires ink-amount data, which correspond to the respective colors, from the color conversion processing unit 222 and generates print data by performing halftoning on the ink-amount data.

An image represented by image data is printed on the sheet P in a case in which the respective ink jet heads 46C, 46M, 46Y, 46K, 46R, 46G, and 46B of the printing section 40 are driven on the basis of the generated print data.

<Selection of LUT>

Since a plurality of LUTs to be used in the color conversion processing unit 222 are prepared as described above, a LUT to be used is switched according to the number of printed sheets.

The computer 200 selects a LUT to be used. The computer 200 functions as a LUT selection unit 230 (a look-up table selection unit) by executing a predetermined program.

Figure 4:
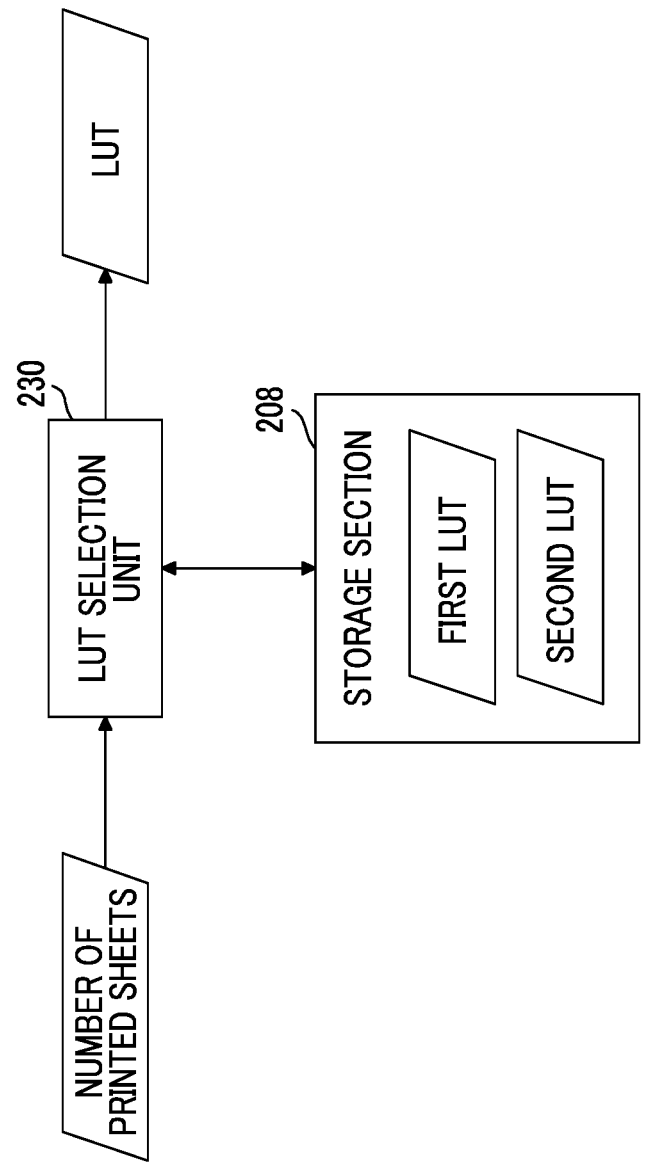
FIG. 4 is a block diagram of functions that are provided by a LUT selection unit.

FIG. 4 is a block diagram of functions that are provided by the LUT selection unit.

As shown in FIG. 4, the LUTs are stored in the storage section 208. In the ink jet printing apparatus 1 of this embodiment, two LUTs are stored in the storage section 208. A total amount of ink after conversion is different in the two LUTs. One LUT is a LUT in which a total amount of ink after conversion is large overall, and the other LUT is a LUT in which a total amount of ink after conversion is small overall. The LUT in which a total amount of ink after conversion is large overall is referred to as a first LUT (a first look-up table) and the LUT in which a total amount of ink after conversion is small overall is referred to as a second LUT (a second look-up table).

"A total amount of ink after conversion" is the sum of the amounts of inks that are combined by conversion.

The LUT in which a total amount of ink after conversion is large overall is a LUT in which a total amount of ink after conversion is relatively large in a case in which all LUTs are compared. The LUT in which a total amount of ink after conversion is small overall is a LUT in which a total amount of ink after conversion is relatively small in a case in which all LUTs are compared. That is, in a case in which multiple amounts of inks can be combined in regard to an input color value, a LUT which has a combination in which a total amount of ink after conversion is large even in regard to any input color value is a LUT in which a total amount of ink after conversion is large overall. On the contrary, a LUT having combinations in which a total amount of ink after conversion is small even in regard to any input color value is a LUT in which a total amount of ink after conversion is small overall. Since there is also a case in which only one combination is present in some cases of input color values, a total amount of ink after conversion in the first LUT is the same as a total amount of ink after conversion in the second LUT in this case. However, in a case in which all LUTs are compared, a total amount of ink after conversion in the first LUT is relatively larger than a total amount of ink after conversion in the second LUT.

FIG. 5 is a diagram showing examples of the first LUT and the second LUT (Excerpt).

FIG. 5 shows examples of LUTs in a case in which image data expressed as an RGB format having 256 gradations (8 bits, the maximum value of 255) is subjected to the color conversion processing.

The numerical value of each of R (red), G (green), and B (blue) of an input color value (an input RGB value) is the gradation value (0 to 255) of each of R, G, and B.

The numerical value of each of C (cyan), M (magenta), Y (yellow), K (black), R (red), G (green), and B (blue) of the first and second LUTs is the amount of (percentage: 0 to 100) each of inks having the colors of C, M, Y, K, R, G, and B.

The amount of ink to be combined is changed depending on the concentration, type, and the like of a color material of ink to be used. Accordingly, the LUTs shown in FIG. 5 are merely examples.

As shown in FIG. 5, the first LUT has a combination in which a total amount of ink after conversion is larger overall than that of the second LUT.

For example, in a case in which an input color value is "[R,G,B]=[255,0,0] (so-called red)", the input color value is converted into "[C,M,Y,K,R,G,B]=[0,99,100,0,0,0,0]" in the first LUT. The input color value is converted into "[C,M,Y,K,R,G,B]=[0,0,0,0,100,0,0]" in the second LUT. A total amount of ink after conversion is 199 (99+100) in the first LUT. A total amount of ink after conversion is 100 in the second LUT. Accordingly, the first LUT has a combination in which a total amount of ink after conversion is larger than that of the second LUT.

Further, for example, in a case in which an input color value is "[R,G,B]=[0,255,0] (so-called green)", the input color value is converted into "[C,M,Y,K,R,G,B]=[63,0,100,0,0,0,0]" in the first LUT. The input color value is converted into "[C,M,Y,K,R,G,B]=[0,0,0,0,0,100,0]" in the second LUT. A total amount of ink after conversion is 163 (63+100) in the first LUT. A total amount of ink after conversion is 100 in the second LUT. Accordingly, the first LUT has a combination in which a total amount of ink after conversion is larger than that of the second LUT.

Furthermore, for example, in a case in which an input color value is "[R,G,B]=[0,0,255] (so-called blue)", the input color value is converted into "[C,M,Y,K,R,G,B]=[88,77,0,0,0,0,0]" in the first LUT. The input color value is converted into "[C,M,Y,K,R,G,B]=[0,0,0,0,0,0,100]" in the second LUT. A total amount of ink after conversion is 165 (88+77) in the first LUT. A total amount of ink after conversion is 100 in the second LUT. Accordingly, the first LUT has a combination in which a total amount of ink after conversion is larger than that of the second LUT.

For example, in a case in which an input color value is "[R,G,B]=[255,255,0] (so-called yellow)", the input color value is converted into "[C,M,Y,K,R,G,B]=[0,0,100,0,0,0,0]" in both the first and second LUTs. Likewise, even in a case in which an input color value is "[R,G,B]=[254,255,0]", a case in which an input color value is "[R,G,B]=[127,255,0]", and the like, both the first and second LUTs have combinations in which a total amount of ink after conversion is the same. These color values correspond to a case in which there is only one combination to which the amount of ink can be converted. In this case, both the first and second LUTs have combinations in which a total amount of ink after conversion is the same.

As described above, in regard to some color values, the first and second LUTs have combinations in which a total amount of ink after conversion is the same. However, in a case in which all the LUTs are compared, a total amount of ink after conversion in the first LUT is larger than a total amount of ink after conversion in the second LUT.

The LUT selection unit 230 acquires the information about the number N of printed sheets, and compares the number N of printed sheets with a predetermined threshold value X. Then, the LUT selection unit 230 selects the first LUT in case in which the number of printed sheets is smaller than the threshold value (N<X), and selects the second LUT in a case in which the number of printed sheets is equal to or larger than the threshold value (X≤N). That is, the LUT selection unit 230 determines that there is a concern that offset and blocking may be generated in a case in which the number of printed sheets is equal to or larger than the threshold value, and selects the second LUT in which a total amount of ink after conversion is small overall. On the other hand, the LUT selection unit 230 determines that there is no concern that offset and blocking may be generated in a case in which the number of printed sheets is smaller than the threshold value, and selects the first LUT in which a total amount of ink after conversion is large overall. The threshold value X is set on the basis of experiments, and the like.

<<Procedure for Processing Image Data>>

Figure 6:
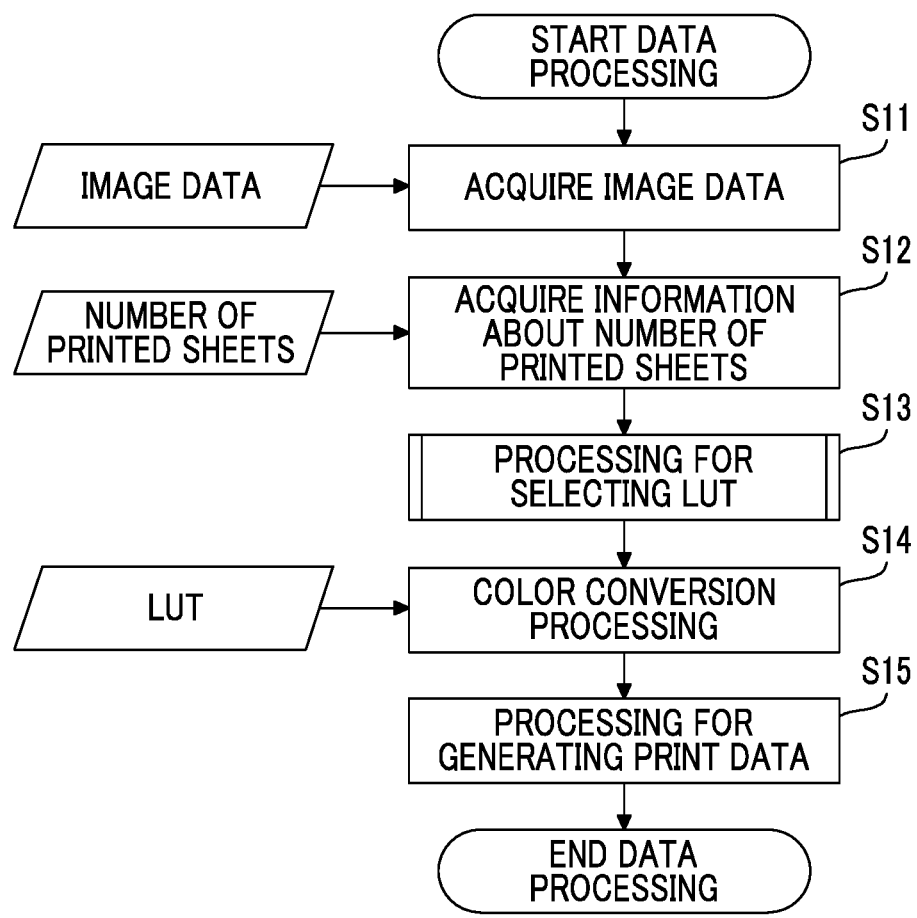
FIG. 6 is a flow chart showing a procedure for processing image data until print data is generated.

FIG. 6 is a flow chart showing a procedure for processing image data until print data is generated.

First, image data is acquired (Step S11). Then, the information about the number of sheets on which the image data has been printed is acquired (Step S12). After that, processing for selecting a LUT to be used in the color conversion processing is performed on the basis of the acquired number of printed sheets (Step S13).

Figure 7:
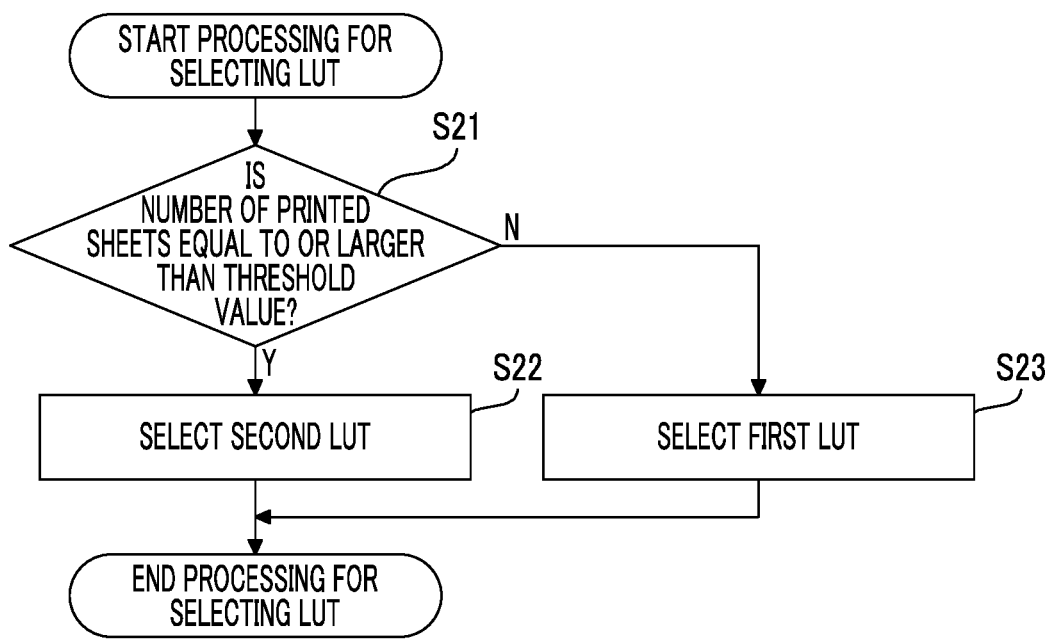
FIG. 7 is a flow chart showing a procedure of processing for selecting a LUT.

FIG. 7 is a flow chart showing a procedure of the processing for selecting a LUT.

The LUT selection unit 230 compares the acquired number N of printed sheets with the threshold value X, and determines whether or not the number N of printed sheets is equal to or larger than the threshold value (Step S21).

If the number N of printed sheets is equal to or larger than the threshold value, the LUT selection unit 230 selects the second LUT in which a total amount of ink after conversion is small overall as a LUT to be used in the color conversion processing (Step S22).

On the other hand, if the number N of printed sheets is smaller than the threshold value, the LUT selection unit 230 selects the first LUT in which a total amount of ink after conversion is large overall as a LUT to be used in the color conversion processing (Step S23).

When the processing for selecting a LUT is completed, the color conversion processing is performed on the basis of the selected LUT (Step S14). After that, print data is generated on the basis of ink-amount data obtained through the color conversion processing (Step S15).

When the generation of the print data is completed, printing processing is started. The computer 200 drives each of the ink jet heads 46C, 46M, 46Y, 46K, 46R, 46G, and 46B of the printing section 40 on the basis of the generated print data, and prints an image, which is represented by image data, on a sheet P.

According to the ink jet printing apparatus 1 of this embodiment, since a plurality of LUTs having different combinations of the amounts of inks are prepared as described above, LUTs can be selectively used according to the number of printed sheets. Since a LUT in which a total amount of ink after conversion is smaller as the number of printed sheets is increased is selected as the LUT, the generation of offset and blocking can be appropriately prevented. Further, ink can also be stably jetted. That is, in a case in which the number of printed sheets is large, color conversion processing is performed so that a total amount of ink is relatively small. Accordingly, the generation of offset and blocking can be effectively prevented. Further, in a case in which the number of printed sheets is small and a concern about the generation of offset and blocking is low, color conversion processing is performed so that a total amount of ink is relatively small. Accordingly, all the heads can uniformly jet ink. Therefore, ink can be stably jet.

Second Embodiment

The possibility of offset and blocking also changes depending on a printing speed, the type of a sheet to be used, the weight of a sheet to be used, environmental temperature at a place in which an ink jet printing apparatus is installed, environmental humidity at a place in which the ink jet printing apparatus is installed, and the like.

For example, since sheets are rapidly collected in the collection section, that is, an increase rate of a load to be applied to the lower sheet is high as a printing speed is increased, offset and blocking are likely to be generated.

Further, in regard to the type of a sheet, the possibility of offset and blocking changes depending on the permeability of a sheet. Specifically, since a solvent contained in ink more slowly permeates into the sheet as the permeability of a sheet is lowered, that is, a sheet is closer to a low-permeable sheet, offset and blocking are likely to be generated.

Furthermore, offset and blocking are likely to be generated as the weight of a sheet is increased. Since the weight of a sheet is increased as the thickness of a sheet is increased, the weight of a sheet can be replaced with the thickness of a sheet. That is, offset and blocking are likely to be generated as the thickness of a sheet is increased.

Moreover, offset and blocking are likely to be generated as environmental temperature rises. Likewise, offset and blocking are likely to be generated as environmental humidity is also increased.

In an ink jet printing apparatus of this embodiment, the optimum LUT is selected in consideration of these types of information. A method of selecting a LUT in the ink jet printing apparatus of this embodiment will be described blow.

<<Configuration>>

FIG. 8 is a block diagram of a function to perform processing for selecting a LUT in an ink jet printing apparatus of a second embodiment.

As shown in FIG. 8, the ink jet printing apparatus of this embodiment further includes a threshold value setting unit 240 in addition to the ink jet printing apparatus of the first embodiment.

The threshold value setting unit 240 sets a threshold value, which is to be used in the LUT selection unit 230, on the basis of the information about a printing speed, the information about the type of a sheet to be used, the information about the weight of a sheet to be used, the information about environmental temperature, and the information about environmental humidity. Specifically, the threshold value setting unit 240 selects and sets a threshold value, which is to be used to select a LUT, with reference to a threshold value setting table that is stored in the storage section 208 in advance.

FIG. 9 is a diagram showing an example of the threshold value setting table.

As shown in FIG. 9, the threshold value setting table is set so that a threshold value to be selected is associated with the type of a sheet, environmental temperature, environmental humidity, the weight of a sheet, and a printing speed.

Here, the types of sheets are classified on the basis of permeability. That is, the types of sheets are classified on the basis of whether a sheet is a high-permeable sheet or a low-permeable sheet. High-quality paper is a high-permeable sheet, and a coated paper is a low-permeable sheet. Under the same conditions, a concern about the generation of offset and blocking is higher in the case of a low-permeable sheet. Accordingly, a threshold value is set to be smaller in the case of a low-permeable sheet.

Environmental temperature and environmental humidity are classified as environmental temperature/humidity so as to be associated with each other.

FIG. 10 is a graph showing classification criteria for environmental temperature/humidity.

As shown in FIG. 10, environmental temperature and environmental humidity are associated with each other and are classified into Zone-1 and Zone-2. In FIG. 10, a hatched region is Zone-1.

For example, in a case in which environmental temperature is 20[° C.] and environmental humidity is 20[% RH], environmental temperature and environmental humidity are classified into Zone-1. Further, in a case in which environmental temperature is 30[° C.] and environmental humidity is 50[% RH], environmental temperature and environmental humidity are classified into Zone-2. The environmental humidity is relative humidity.

Offset and blocking are easily generated in Zone-2 in comparison with Zone-1. Accordingly, a threshold value is set to be smaller in the case of Zone-2.

The weight (thickness) of a sheet is classified by 200 [gsm]. In the case of a sheet heavier than 200 [gsm], it is determined that a concern about the generation of offset and blocking is high. Accordingly, a threshold value is set to be small.

The unit [gsm] of the weight of a sheet is an abbreviation of "Grams per Square Meter", and is synonymous with [g/m²]. That is, the unit [gsm] represents weight (g) per square meter. Accordingly, 200 [gsm] is synonymous with 200 [g/m²].

A printing speed is classified into a high speed and a low speed. A concern about the generation of offset and blocking is higher as a printing speed is higher. Accordingly, a threshold value is set to be smaller in the case of a high speed.

According to the threshold value setting table of FIG. 9, a threshold value is 2000 in a case in which, for example, a sheet to be used is high-quality paper (a high-permeable sheet), the classification of environmental temperature/humidity corresponds to Zone-1, the weight of a sheet to be used is 100 [gsm], and a printing speed is high.

The function of the threshold value setting unit 240 is achieved by the computer 200. That is, the computer 200 functions as the threshold value setting unit 240 by executing a predetermined program.

Further, information, such as the information about a printing speed required for the processing for setting a threshold value, the information about the type of a sheet to be used, the information about the weight of a sheet to be used, the information about environmental temperature, and the information about environmental humidity, is acquired as print information by the computer 200. Accordingly, the computer 200 also functions as a print information acquisition unit. For example, an operator inputs the print information from the operation section 204. A temperature sensor and a humidity sensor may also be installed to automatically acquire the information about environmental temperature and the information about environmental humidity. Further, even in regard to a printing speed, information of an installed printing speed sensor can also be automatically acquired.

The LUT selection unit 230 selects a LUT, which is to be used in the color conversion processing, on the basis of a threshold value that is set by the threshold value setting unit 240.

<<Processing for Selecting LUT>>

FIG. 11 is a flow chart showing a procedure of processing for selecting a LUT that includes processing for setting a threshold value.

First, print information is acquired (Step S31). Then, a threshold value is set on the basis of the acquired print information (Step S32). That is, the threshold value setting unit 240 sets a threshold value, which corresponds to the acquired print information, with reference to the threshold value setting table.

When the setting of a threshold value ends, the selection of a LUT is performed on the basis of the number of printed sheets. First, the LUT selection unit 230 compares the acquired number of printed sheets with the threshold value, and determines whether or not the number of printed sheets is equal to or larger than the set threshold value (Step S33).

If the number of printed sheets is equal to or larger than the set threshold value, the LUT selection unit 230 selects the second LUT in which a total amount of ink after conversion is small overall as a LUT to be used in the color conversion processing (Step S34).

On the other hand, if the number of printed sheets is smaller than the set threshold value, the LUT selection unit 230 selects the first LUT in which a total amount of ink after conversion is large overall as a LUT to be used in the color conversion processing (Step S35).

According to the ink jet printing apparatus of this embodiment, as described above, the information about a printing speed, the information about the type of a sheet to be used, the information about the weight of a sheet to be used, the information about environmental temperature, and the information about environmental humidity are considered in addition to the information about the number of printed sheets in a case in which a LUT to be used in the color conversion processing is to be selected. Accordingly, since it is possible to more accurately grasp whether or not there is a concern about the generation of offset and blocking, it is possible to more appropriately select a LUT.

In the embodiment, the respective types of information acquired as the print information have been classified into two categories so that a threshold value to be used to select a LUT is set. However, the respective types of information can also be classified in more detail so that a threshold value to be used to select a LUT is set.

Further, in the embodiment, the information about a printing speed, the information about the type of a sheet to be used, the information about the weight of a sheet to be used, the information about environmental temperature, and the information about environmental humidity have been used as the print information to be used to set a threshold value. However, all the information does not need to be necessarily used. Furthermore, information other than these types of information can also be further added to set a threshold value.

Moreover, in the embodiment, threshold values have been set in the form of a table. However, a function can also be determined to set a threshold value.

Third Embodiment

The number of selectable LUTs has been two in the above-mentioned embodiments, but more LUTs can also be adapted to be selected. As the number of colors of inks to be used is increased, the degree of freedom in setting a LUT is increased.

It is preferable that a LUT is set on the basis of a ratio of the amount of a solvent of ink to be combined in a case in which a LUT is to be set. A ratio of the amount of a solvent of ink is a ratio of a solvent contained in ink. A ratio of the amount of a solvent of ink significantly affects offset and blocking. As a ratio of the amount of a solvent of ink to be used is increased, a concern about the generation of offset and blocking is increased. Accordingly, it is possible to more appropriately prevent the generation of offset and blocking by setting each look-up table in consideration of a ratio of the amount of a solvent of ink to be combined.

A method of setting a LUT considering a ratio of the amount of a solvent of ink will be described below.

<<Setting of LUT>>

Now, ratios of the amounts of solvents of inks having the colors of cyan (C), magenta (M), yellow (Y), black (K), red (R), green (G), and blue (B) are set to 10% (C), 20% (M), 20% (Y), 10% (K), 10% (R), 10% (G), and 10% (B), respectively. In this case, ratios of the amounts of solvents of inks of magenta (M) and yellow (Y) are relatively high. Accordingly, even though a total amount of ink is the same, a concern about the generation of offset and blocking in a combination in which the amounts of inks of magenta (M) and yellow (Y) are increased is relatively higher than those in other combinations of inks having other colors. In this case, if a combination in which the amounts of inks of magenta (M) and yellow (Y) are small can be made, it is possible to more appropriately set a LUT by employing the combination.

Here, a case in which three LUTs are set on the basis of a ratio of the amount of a solvent of ink will be described by way of example.

First, a combination of ink-amount data in which a total amount of ink after conversion is increased and a combination of ink-amount data in which a total amount of ink after conversion is reduced are set in regard to each input color value. The combination of ink-amount data in which a total amount of ink after conversion is increased is referred to as a first combination α, and the combination of ink-amount data in which a total amount of ink after conversion is reduced is referred to as a second combination β. There is also a case in which only one piece of ink-amount data can be set in some cases of input color values. In this case, the first combination is the same as the second combination. Accordingly, the combination of ink-amount data in which a total amount of ink after conversion is increased is a combination of ink-amount data in which a total amount of ink after conversion is increased relatively in a case in which all combinations are considered.

FIG. 12 is a table showing examples of the first combination α and the second combination β in regard to each input color value (Excerpt).

According to FIG. 12, for example, in a case in which an input color value is "[R,G,B]=[255,0,0] (so-called red)", the input color value is converted into "[C,M,Y,K,R,G,B]=[0, 99,100,0,0,0,0]" in the first combination α. On the other hand, the input color value is converted into "[C,M,Y,K,R, G,B]=[0,0,0,0,100,0,0]" in the second combination β. A total amount of ink after conversion using the first combination α is 199. On the other hand, a total amount of ink after conversion using the second combination β is 100. Accordingly, a total amount of ink after conversion using the first combination α is larger than a total amount of ink after conversion using the second combination β.

Further, in a case in which an input color value is "[R,G,B]=[0,255,0] (so-called green)", the input color value is converted into "[C,M,Y,K,R,G,B]=[63,0,100,0,0,0,0]" in the first combination α. On the other hand, the input color value is converted into "[C,M,Y,K,R,G,B]=[0,0,0,0,0,100, 0]" in the second combination β. A total amount of ink after conversion using the first combination α is 163. On the other hand, a total amount of ink after conversion using the second combination β is 100. Accordingly, a total amount of ink after conversion using the first combination α is larger than a total amount of ink after conversion using the second combination β.

Furthermore, in a case in which an input color value is "[R,G,B]=[0,0,255] (so-called blue)", the input color value is converted into "[C,M,Y,K,R,G,B]=[88,77,0,0,0,0,0]" in the first combination α. On the other hand, the input color value is converted into "[C,M,Y,K,R,G,B]=[0,0,0,0,0,0, 100]" in the second combination β. A total amount of ink after conversion using the first combination α is 165. On the other hand, a total amount of ink after conversion using the second combination β is 100. Accordingly, a total amount of ink after conversion using the first combination α is larger than a total amount of ink after conversion using the second combination β.

Next, a LUT is set on the basis of the first combination α and the second combination β that are set.

First, a LUT employing the first combination α in regard to all input color values and a LUT employing the second combination β in regard to all input color values are set. The LUT employing the first combination α in regard to all input color values is referred to as a first LUT (a first look-up table). On the other hand, the LUT employing the second combination β in regard to all input color values is referred to as a second LUT (a second look-up table).

Next, a LUT in which a total amount of ink after conversion is smaller than that in the first LUT in regard to a specific input color value is set. This LUT is referred to as a third LUT (a third look-up table).

The specific input color value is an input color value that allows the amounts of inks of magenta (M) and yellow (Y) in which a ratio of the amount of a solvent is high to be increased in a case in which the first combination α is employed. Specifically, the specific input color value is an input color value that allows a total amount of inks of magenta (M) and yellow (Y) to be equal to or larger than a certain amount in a case in which the first combination α is employed.

Accordingly, the third LUT is a LUT that employs the second combination β in regard to the specific input color value and employs the first combination α in regard to other input color values.

FIG. 13 is a diagram showing examples of the first LUT, the second LUT, and the third LUT (Excerpt).

As shown in FIG. 13, the amounts of inks of magenta (M) and yellow (Y) are increased in a case in which an input color value is "[R,G,B]=[255,0,0] (so-called red)" and the first combination α is employed. For this reason, in the third LUT, the second combination β is employed in regard to an input color value of "[R,G,B]=[255,0,0]".

Since the third LUT employs a combination in which a total amount of ink after conversion is reduced in regard to only a specific input color value, a total amount of ink after conversion in the third LUT is smaller than that in the first LUT and is larger than that in the second LUT in a case in which all combinations are considered. That is, the third LUT is an intermediate LUT in terms of a total amount of ink after conversion.

Since a LUT is set in consideration of a ratio of the amount of a solvent of ink as described above, it is possible to appropriately set a LUT in consideration of the possibility of offset and blocking.

The embodiment corresponds to a case in which three LUTs are set, but a plurality of LUTs more than three LUTs can be set by the same procedure.

<<Processing for Selecting a LUT>>

Next, a method of selecting a LUT in a case in which three or more LUTs are provided will be described.

In a case in which three or more LUTs are provided, a plurality of threshold values are set and a LUT is switched in stages. For example, in a case in which three LUTs (the first LUT, the second LUT, and the third LUT) are provided, two threshold values (a first threshold value X1 and a second threshold value X2) are set. The second threshold value X2 is set to a value larger than the first threshold value X1 (X1<X2). In this case, the first LUT is selected in a case in which the number N of printed sheets is smaller than the first threshold value (N<X1). The third LUT is selected in a case in which the number N of printed sheets is equal to or larger than the first threshold value and smaller than the second threshold value (X1≤N<X2). The second LUT is selected in a case in which the number N of printed sheets is equal to or larger than the second threshold value (X2≤N).

Figure 14:
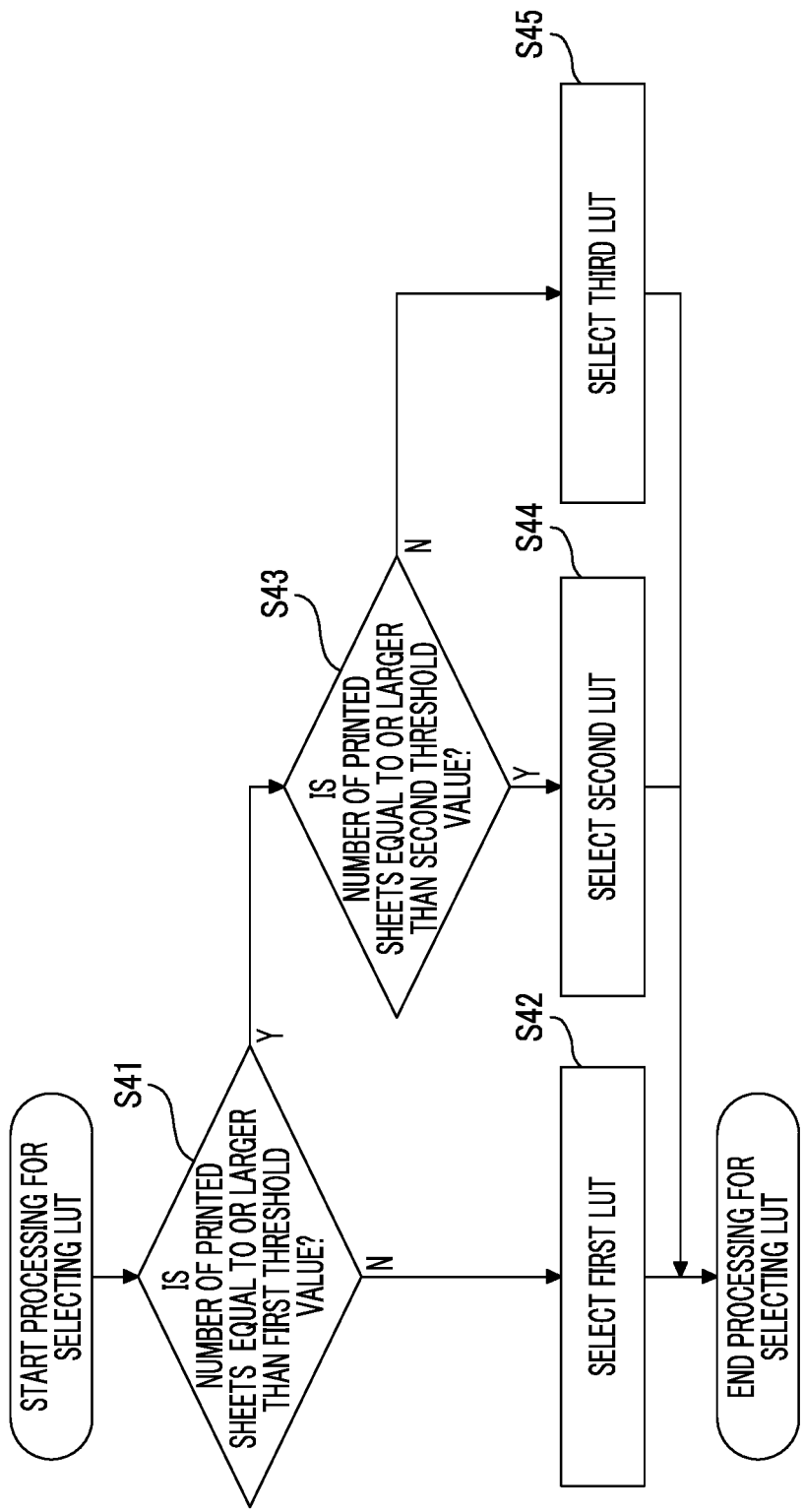
FIG. 14 is a flow chart showing a procedure of processing for selecting a LUT in a case in which three LUTs are provided.

FIG. 14 is a flow chart showing a procedure of processing for selecting a LUT in a case in which three LUTs are provided.

First, the number N of printed sheets and the first threshold value X1 are compared with each other, and it is determined whether or not the number of printed sheets is equal to or larger than the first threshold value (Step S41).

If the number N of printed sheets is not equal to or not larger than the first threshold value, that is, if the number N of printed sheets is smaller than the first threshold value, the first LUT is selected as a LUT to be used in the color conversion processing (Step S42).

On the other hand, if the number N of printed sheets is equal to or larger than the first threshold value, the number N of printed sheets and the second threshold value X2 are then compared with each other and it is determined whether or not the number of printed sheets is equal to or larger than the second threshold value (Step S43).

If the number N of printed sheets is equal to or larger than the second threshold value, the second LUT is selected as a LUT to be used in the color conversion processing (Step S44).

On the other hand, if the number N of printed sheets is not equal to or not larger than the second threshold value, that is, if the number N of printed sheets is equal to or larger than the first threshold value and smaller than the second threshold value, the third LUT is selected as a LUT to be used in the color conversion processing (Step S45).

As described above, in a case in which three or more LUTs are provided, a plurality of threshold values are set and a look-up table in which a total amount of ink after conversion is smaller as the number of printed sheets is increased is selected.

As described in the second embodiment, a threshold value is set in consideration of print information, such as the information about a printing speed, the information about the type of a sheet to be used, the information about weight of a sheet to be used, the information about environmental temperature, and the information about environmental humidity. Accordingly, it is possible to more appropriately select a LUT.

Fourth Embodiment

There is a case in which the next print job is to be continuously performed without the removal of printed articles (printed sheets) from the collection section 60 after one print job ends. In this case, there is a concern that offset and blocking may be generated on the articles printed previously.

Accordingly, in a case in which print jobs are continuously performed without the removal of printed articles from the collection section 60, it is preferable that information about the next and later print jobs is taken to determine whether or not there is a concern about the generation of offset and blocking.

Processing in a case in which print jobs are continuously performed without the removal of printed articles from the collection section 60 will be described below.

In a case in which print jobs are continuously performed without the removal of printed articles from the collection section 60, information about the next print job is taken to select a LUT to be used in the color conversion processing.

Figure 15:
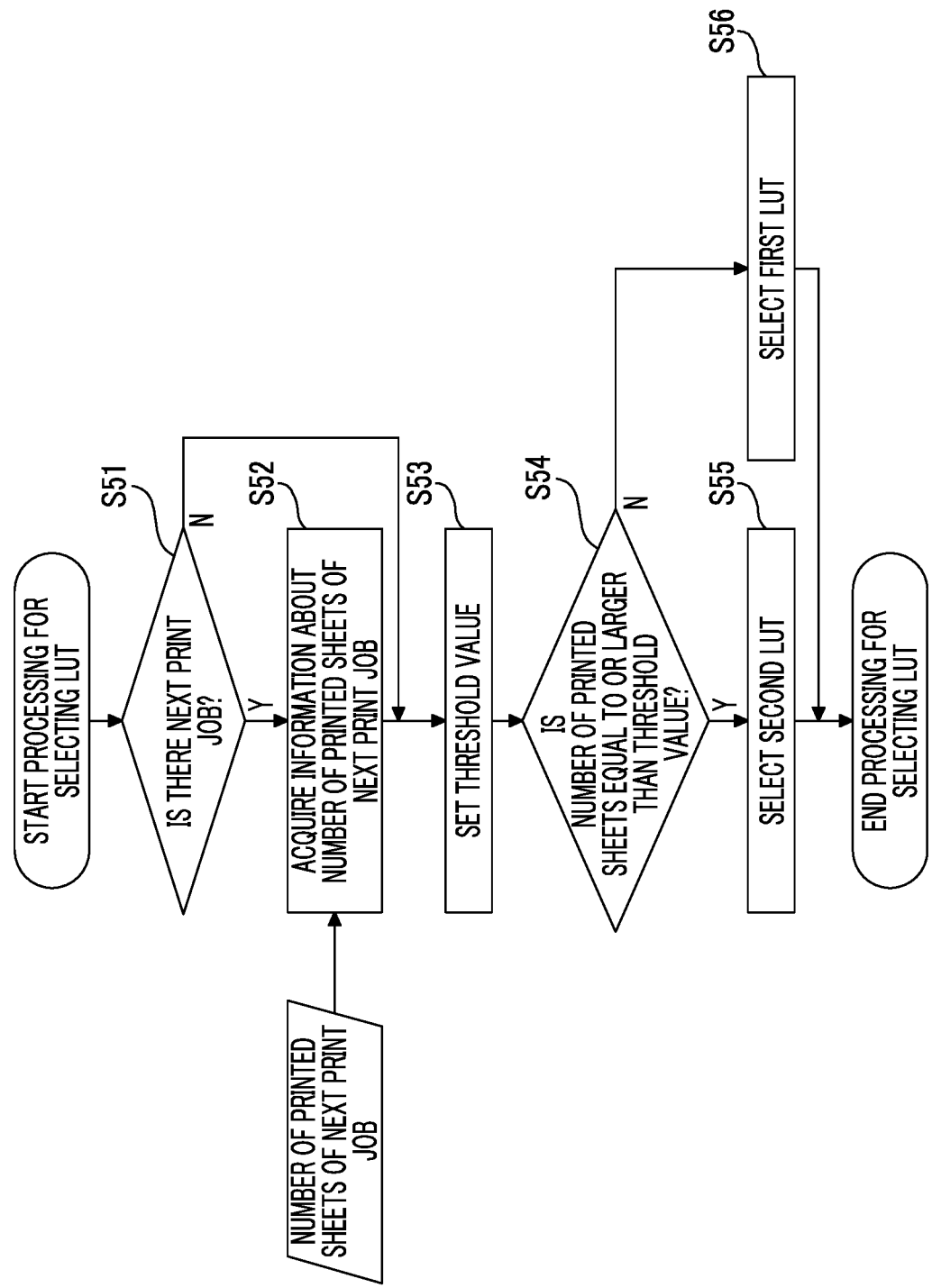
FIG. 15 is a flow chart showing a procedure of processing for selecting a LUT.

FIG. 15 is a flow chart showing a procedure of processing for selecting a LUT.

First, it is determined whether or not the next print job is present (Step S51). Whether or not the next print job is present is determined on the basis of whether or not a waiting print job is present in the storage section 208.

In a case in which the next print job has been already acquired, information about the number of printed sheets of the next print job is acquired (Step S52). Then, a threshold value is set on the basis of the acquired information about the number of printed sheets (Step S53).

Here, the threshold value is set to be lower as the number of printed sheets of the next print job is increased. The reason for this is that a concern about the generation of offset and blocking is increased as the number of printed sheets of the next print job is increased.

A threshold value corresponding to a predetermined criterion is set in a case in which the next print job is not present.

When the setting of the threshold value ends, the selection of a LUT is performed on the basis of the number of printed sheets of a print job that is to be performed at this time. First, the number of printed sheets and the threshold value are compared with each other and it is determined whether or not the number of printed sheets is equal to or larger than the set threshold value (Step S54).

If the number of printed sheets is equal to or larger than the threshold value, the second LUT is selected as a LUT to be used in the color conversion processing (Step S55). On the other hand, if the number of printed sheets is smaller than the set threshold value, the first LUT is selected as a LUT to be used in the color conversion processing (Step S56).

Since a threshold value is set in consideration of a print job to be processed next and a LUT is selected as described above, the generation of offset and blocking can be appropriately prevented even in a case in which print jobs are continuously performed.

Only the information about the number of printed sheets of the next print job has been used in the embodiment, but the print information of the next print job can be used. That is, the information about a printing speed of the next print job, the information about the type of a sheet to be used in the next print job, the information about the weight of the sheet to be used in the next print job, and the like may be used to set a threshold value and to select a LUT. Accordingly, it is possible to more accurately determine whether or not there is a concern about the generation of offset and blocking.

Further, only the information about the number of printed sheets of the next print job has been used in the embodiment, but the information about the number of printed sheets of all the next and later print jobs can also be used to set a threshold value in a case in which the next and later print jobs are present. In this case, the print information of the next and later print jobs can also be used.

Furthermore, the print information of a print job, which is to be performed at this time, can also be used to set a threshold value.

Fifth Embodiment

In a case in which print jobs are continuously performed without the removal of printed articles from the collection section 60 as described above, there is a concern that offset and blocking are generated on the printed articles not removed.

Accordingly, in a case in which a plurality of print jobs are continuously performed in an ink jet printing apparatus of this embodiment, it is determined whether or not print jobs can be continuously performed without the removal of printed articles from the collection section 60 before each print job.

In a case in which print jobs are continuously performed without the removal of printed articles from the collection section 60, offset and blocking are generated on the printed articles left in the collection section 60. In this case, the number of printed articles left in the collection section 60, the amount of ink, and the number of printed articles of the print jobs continuously performed significantly affect offset and blocking. Accordingly, the information about the number of sheets printed in the previous printing, the information about a LUT used in the previous printing, and the information about the number of sheets printed in this printing are used for determination.

The ink jet printing apparatus of this embodiment further includes a determination information acquisition unit 250 that acquires information required for determination, a determination unit 260 that determines whether or not there is a concern about the generation of offset and blocking on the basis of the determination information acquired by the determination information acquisition unit 250, and a warning unit 270 that generates a warning on the basis of the determination result of the determination unit 260.

The functions of the determination information acquisition unit 250, the determination unit 260, and the warning unit 270 are achieved by the computer 200. That is, the computer 200 functions as the determination information acquisition unit 250, the determination unit 260, and the warning unit 270 by executing predetermined programs.

The determination information acquisition unit 250, the determination unit 260, and the warning unit 270 of the ink jet printing apparatus of this embodiment will be described below.

<<Configuration>>

Figure 16:
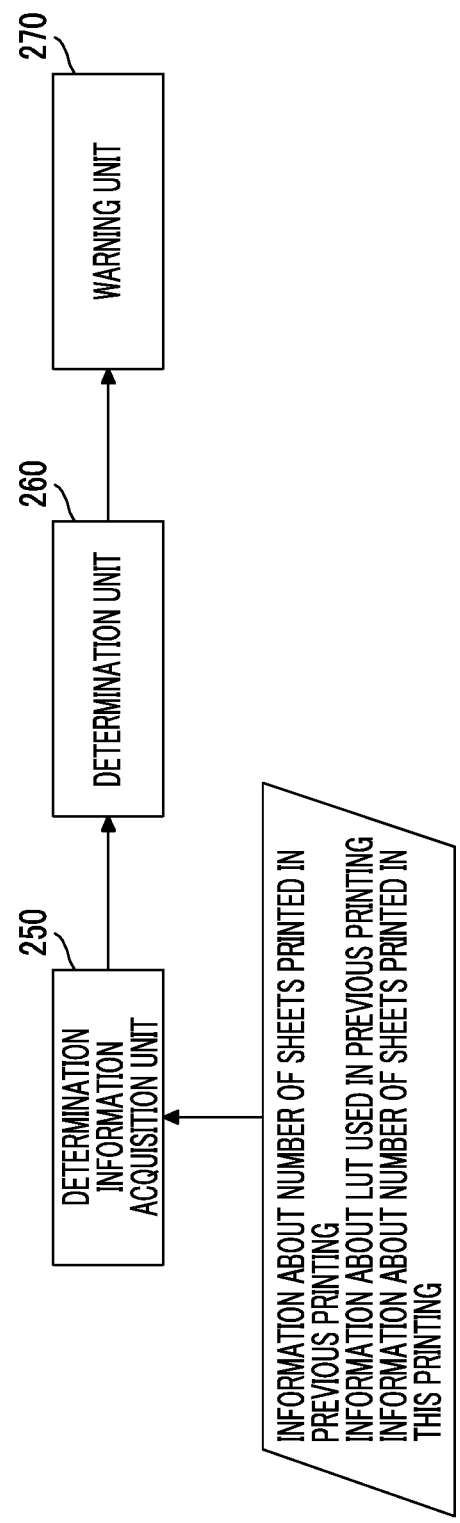
FIG. 16 is a block diagram of configuration relating to the determination of whether or not there is a concern about the generation of offset and blocking.

FIG. 16 is a block diagram of configuration relating to the determination of whether or not there is a concern about the generation of offset and blocking.

<Determination Information Acquisition Unit>

The determination information acquisition unit 250 acquires the information about the number of sheets printed in the previous printing, the information about a LUT used in the previous printing, and the information about the number of sheets printed in this printing as the determination information.

In the ink jet printing apparatus of this embodiment, information about a performed print job is stored in the storage section 208. Print information including the information about the number of printed sheets and information about a used LUT are included in this information. The determination information acquisition unit 250 acquires the information about the number of sheets printed in the previous printing and the information about a LUT used in the previous printing by reading the information stored in the storage section 208. Further, the determination information acquisition unit 250 acquires the information about the number of sheets printed in this printing by reading the information about the print job stored in the storage section 208.

<Determination Unit>

The determination unit 260 determines whether or not there is a concern about the generation of offset and blocking on the basis of the determination information acquired by the determination information acquisition unit 250. Determination is performed with reference to, for example, a table. That is, a table in which whether or not there is a concern about the generation of offset and blocking is prescribed using a combination of the number of sheets printed in the previous printing, a LUT used in the previous printing, and the number of sheets printed in this printing is prepared in advance; and the determination unit 260 determines whether or not there is a concern about the generation of offset and blocking with reference to the table.

<Warning Unit>

The warning unit 270 generates a warning in a case in which the determination unit 260 determines that there is a concern about the generation of offset and blocking as the determination result thereof. In the ink jet printing apparatus of this embodiment, the warning unit 270 generates a warning by outputting a warning screen to the touch panel 210 that is the display section 206. The warning screen is displayed by the pop-up of, for example, a message that there is a concern about the generation of offset and blocking.

<<Printing Processing>>

Figure 17:
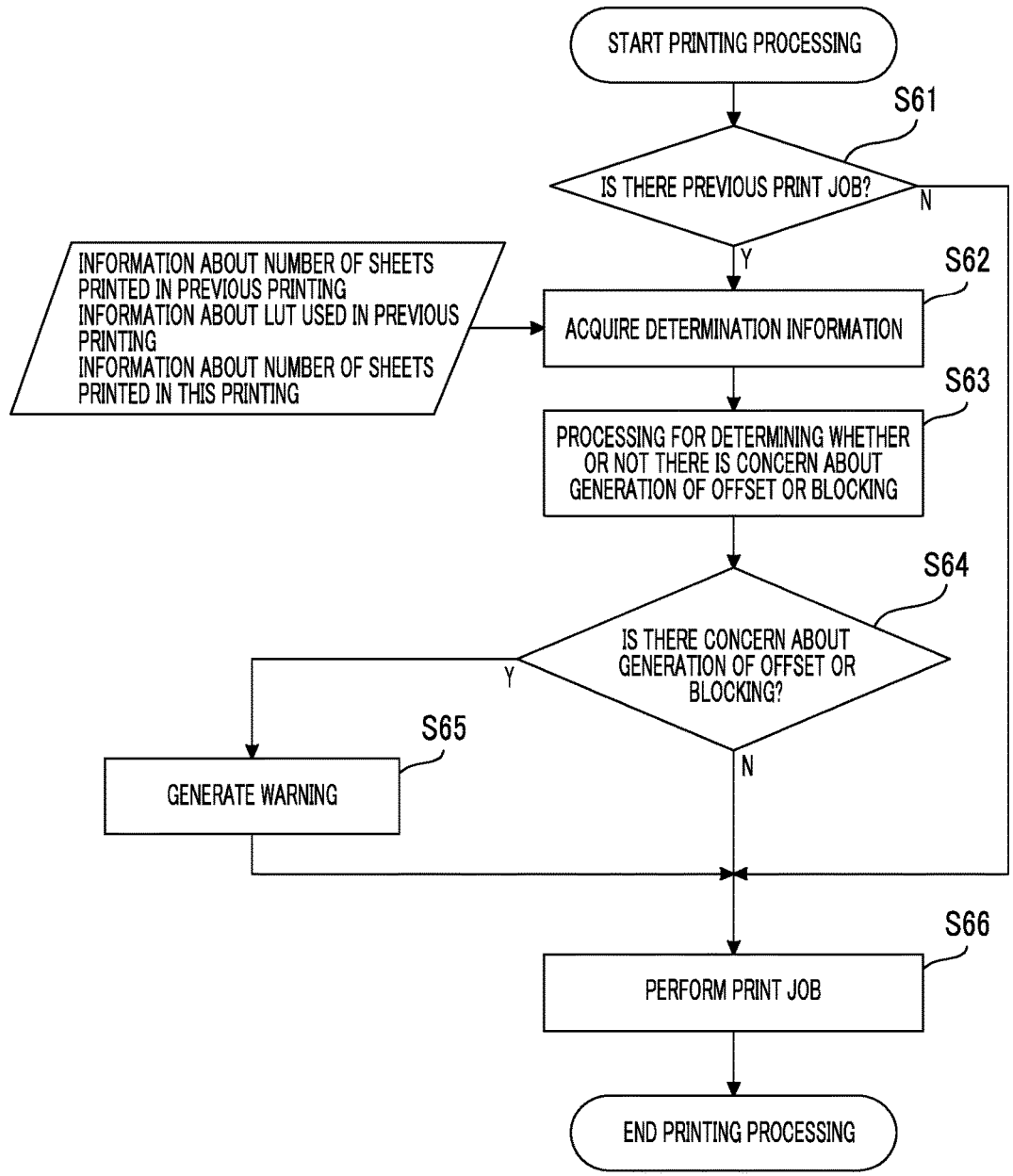
FIG. 17 is a flow chart showing a procedure of printing processing of the ink jet printing apparatus of this embodiment.

FIG. 17 is a flow chart showing a procedure of printing processing of the ink jet printing apparatus of this embodiment.

First, it is determined whether or not there is a print job performed previously (Step S61). If there is a print job performed previously, the determination information is acquired (Step S62). That is, the information about the number of sheets printed in the previous printing, the information about a LUT used in the previous printing, and the information about the number of sheets printed in this printing are acquired.

Next, determination processing is performed using the acquired determination information (Step S63), and it is determined whether or not there is a concern about the generation of offset and blocking (Step S64).

If there is a concern about the generation of offset and blocking as a result of the determination, a warning is generated (Step S65). An operator copes with the concern on the basis of this warning. That is, in a case in which a printed article is left in the collection section 60, an operator removes the printed article from the collection section 60.

After that, a print job is performed (Step S66).

According to the ink jet printing apparatus of this embodiment, as described above, it is determined whether or not there is a concern about the generation of offset and blocking before the print job is performed. Further, a warning is generated in a case in which there is a concern about the generation of offset and blocking. Accordingly, the generation of offset and blocking can be prevented in advance.

An aspect in which a warning screen is displayed on the display section 206 has been employed as a warning method in the embodiment, but the warning method is not limited thereto. In addition, in a case in which the ink jet printing apparatus is provided with a warning lamp, the warning lamp may be made to be turned on to generate a warning. Further, a buzzer or the like may be sounded to generate a warning.

Further, the ink jet printing apparatus can also be adapted to temporarily stop printing processing, to wait for an instruction from a user, and to start printing in a case in which it is determined that there is a concern about the generation of offset and blocking. Alternatively, the ink jet printing apparatus may be adapted to automatically start printing processing after a predetermined time has passed.

Further, in the embodiment, only the information about the number of sheets printed in the previous printing, the information about a LUT used in the previous printing, and the information about the number of sheets printed in this printing have been used in a case in which it is determined whether or not there is a concern about the generation of offset and blocking. However, other information may be used to determine whether or not there is a concern about the generation of offset and blocking. For example, the information about items, which significantly affect offset and blocking, such as the information about a printing speed in the previous printing, the information about the type of a sheet used in the previous printing, the information about the weight of the sheet used in the previous printing, the information about environmental temperature in the previous printing, the information about environmental humidity in the previous printing, the information about a printing speed in this printing, and the information about the weight of a sheet used in this printing, may be further used to determine whether or not there is a concern about the generation of offset and blocking. Accordingly, it is possible to further accurately determine whether or not there is a concern about the generation of offset and blocking.

FIG. 18 is a diagram showing an example of a table in a case in which other information is also used to determine whether or not there is a concern about the generation of offset and blocking.

FIG. 18 shows an example of a case in which the information about the type of a sheet used in the previous printing, the information about environmental temperature/humidity in the previous printing, the information about the weight (thickness) of the sheet used in the previous printing, the information about the number of sheets printed in the previous printing, the information about a LUT used in the previous printing, the information about the number of sheets printed in this printing, the information about the weight (thickness) of a sheet used in this printing, and the information about a printing speed in this printing are used to determine whether or not there is a concern about the generation of offset and blocking.

In the table shown in FIG. 18, "arbitrary" means that there is no limit. That is, "arbitrary" means that any value may be set.

According to the table shown in FIG. 18, for example, there is "no" concern about the generation of offset and blocking in a case in which the sheet used in the previous printing is high-quality paper (a high-permeable sheet), environmental temperature/humidity in the previous printing corresponds to Zone-1, the weight (thickness) of a sheet used in the previous printing is 100 [gsm], the number of sheets printed in the previous printing is 200, a LUT used in the previous printing is the first LUT, the number of sheets printed in this printing is 200, the weight (thickness) of a sheet used in this printing is 100 [gsm], and a printing speed in this printing is high.

It is possible to further accurately determine whether or not there is a concern about the generation of offset and blocking by comprehensively using multiple pieces of information.

Sixth Embodiment

In the ink jet printing apparatus of the fifth embodiment, it is determined whether or not there is a concern about the generation of offset and blocking whenever a print job is performed. In an ink jet printing apparatus of this embodiment, it is determined whether or not there is a concern about the generation of offset and blocking only in a case in which a printed article is left in a collection section 60. For this purpose, the ink jet printing apparatus of this embodiment is further provided with a sheet detecting unit that detects whether or not there is a sheet present in the collection section 60.

Configuration relating to the determination of whether or not there is a concern about the generation of offset and blocking in the ink jet printing apparatus of this embodiment will be described below.

<<Configuration>>

FIG. 19 is a block diagram of configuration relating to the determination of whether or not there is a concern about the generation of offset and blocking.

As shown in FIG. 19, a sheet detecting unit 280 is further provided. The sheet detecting unit 280 is an example of a medium detecting unit. The sheet detecting unit 280 detects whether or not there is a sheet P present in the collection section 60 to detect whether or not a printed article is left in the collection section 60. The sheet detecting unit 280 is formed of, for example, a weight sensor and is installed on a tray of the collection section 60. The sheet detecting unit 280 detects a load, which is applied to the tray, to detect whether or not there is a sheet P present in the collection section 60. The detection result of the sheet detecting unit 280 is output to the determination unit 260.

The determination unit 260 determines whether or not the determination of whether or not there is a concern about the generation of offset and blocking is needed on the basis of the detection result of the sheet detecting unit 280. Then, the determination unit 260 determines whether or not there is a concern about the generation of offset and blocking only in a case in which a sheet is present in the collection section 60, that is, a case in which a printed article is left in the collection section 60.

<<Printing Processing>>

Figure 20:
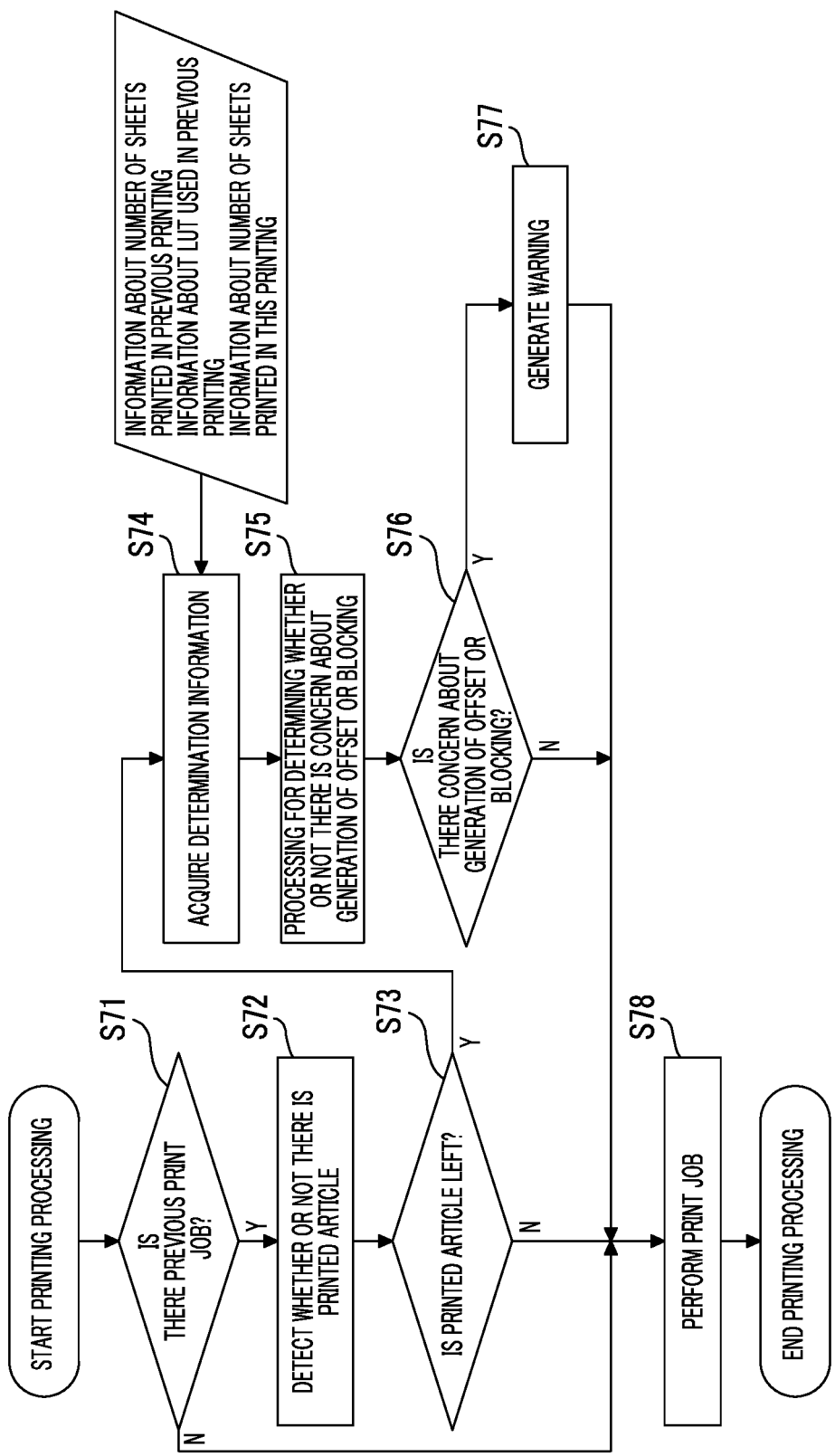
FIG. 20 is a flow chart showing a procedure of printing processing.

FIG. 20 is a flow chart showing a procedure of printing processing.

First, it is determined whether or not there is a print job performed previously (Step S71). If there is a print job performed previously, whether or not there is a sheet P present in the collection section 60 is detected (Step S72). Then, it is determined whether or not a printed article is left in the collection section 60 on the basis of the detection result of Step S72 (Step S73).

If a printed article is not left, a print job is performed as it is (Step S78). On the other hand, if a printed article is left, processing proceeds to determination processing.

First, determination information is acquired (Step S74). Next, determination processing is performed using the acquired determination information (Step S75), and it is determined whether or not there is a concern about the generation of offset and blocking (Step S76).

If there is a concern about the generation of offset and blocking as a result of the determination, a warning is generated (Step S77). An operator copes with the concern on the basis of this warning. That is, an operator removes a printed article that is left in the collection section 60. After that, a print job is performed (Step S78).

According to the ink jet printing apparatus of this embodiment, as described above, it is detected whether or not a printed article is left in the collection section 60, and it is determined whether or not there is a concern about the generation of offset and blocking only in a case in which a printed article is left in the collection section 60. Accordingly, even in a case in which print jobs are continuously performed, the generation of offset and blocking can be appropriately prevented and the print jobs can be performed efficiently.

A weight sensor has been employed as the sheet detecting unit 280 in the embodiment, but means for detecting whether or not there is a sheet P of the collection section 60 is not limited thereto. In addition, for example, an optical sensor that is turned on in a case in which a sheet is placed on a tray and light is blocked by the placed sheet, a contact sensor that is turned on in a case in which a sheet is placed on a tray and the placed sheet comes into contact with the contact sensor, and the like can be employed.

Seventh Embodiment

There is a case in which there is a concern about the generation of offset and blocking in a case in which a warning is generated. Accordingly, in a case in which a printed article remains in the collection section 60, the remaining printed article needs to be removed.

In the ink jet printing apparatus of this embodiment, it is detected whether or not a printed article left in the collection section 60 is correctly removed in a case in which it is determined that there is a concern about the generation of offset and blocking and a warning is generated.

The detection of whether or not a printed article left in the collection section 60 is correctly removed is performed by the sheet detecting unit 280. The sheet detecting unit 280 detects whether or not a sheet P (a printed article) is present in the collection section 60 after a predetermined time has passed after a warning is generated by the warning unit 270. The measurement of the time having passed is performed by a timer (not shown). The timer is provided in the computer 200.

In a case in which a sheet P is detected even after a predetermined time has passed from the generation of a warning, the warning unit 270 generates a warning again.

<<Procedure of Warning Processing>>

Figure 21:
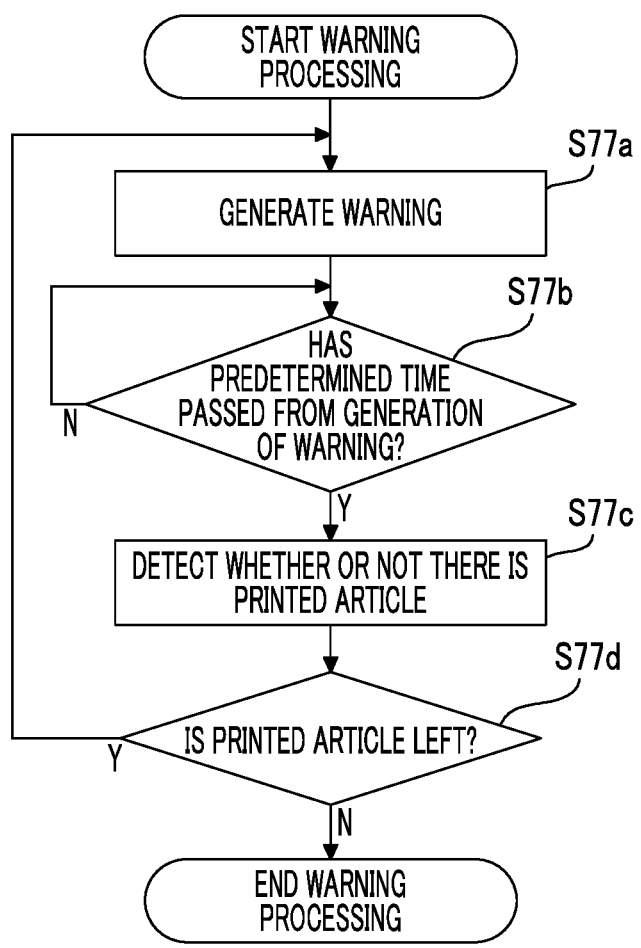
FIG. 21 is a flow chart showing a procedure of processing in a case in which a warning is generated.

FIG. 21 is a flow chart showing a procedure of processing in a case in which a warning is generated.

If it is determined that that there is a concern about the generation of offset and blocking in the determination processing, a warning is generated (Step S77a).

In a case in which a warning is generated, a time having passed from the generation of the warning is measured by the timer (not shown). Then, it is determined whether or not a predetermined time has passed from the generation of the warning on the basis of the result of the measurement of the timer (Step S77b).

If the predetermined time has passed from the generation of the warning, whether or not a sheet P is present is detected by the sheet detecting unit 280 (Step S77c). Then, it is determined whether or not a printed article is left in the collection section 60 on the basis of the detection result of the sheet detecting unit 280 (Step S77d).

If a printed article is still left in the collection section 60, a warning is generated again (Step S77a).

In the ink jet printing apparatus of this embodiment, as described above, it is detected whether or not a printed article left in the collection section 60 is correctly removed in a case in which it is determined that there is a concern about the generation of offset and blocking and a warning is generated. Then, a warning is generated again as necessary. Accordingly, the generation of offset and blocking can be appropriately prevented.

A different type of warning may be generated. For example, a first warning is generated as only a screen display and a second warning may be generated as the sounding of a buzzer or the like in addition to the screen display.

Eighth Embodiment

In the ink jet printing apparatuses of the fifth to seventh embodiments, a warning is generated in a case in which it is determined that there is a concern about the generation of offset and blocking.

In the ink jet printing apparatus of this embodiment, sheets collected in the collection section 60 are automatically discharged in a case in which it is determined that there is a concern about the generation of offset and blocking. For this purpose, the ink jet printing apparatus of this embodiment is further provided with a discharge unit 70 that discharges sheets P collected in the collection section 60, and a discharge controller 290 that controls the operation of the discharge unit 70.

Configuration relating to the automatic discharge of sheets P collected in the collection section 60 will be described below.

<<Configuration>>

FIG. 22 is a functional block diagram of configuration relating to the automatic discharge of sheets.

As shown in FIG. 22, the discharge unit 70 and the discharge controller 290 controlling the operation of the discharge unit 70 are further provided.

<Discharge Unit>

The discharge unit 70 discharges sheets P that are collected in the collection section 60. The discharge unit 70 includes a plurality of stackers, and automatically discharges sheets P from the collection section 60 by automatically switching a stacker set in the collection section 60. Since this type of mechanism is publicly known, the detailed description thereof will be omitted.

<Discharge Controller>

The discharge controller 290 controls the drive of the discharge unit 70 on the basis of the determination result, of the determination unit 260 to automatically discharge sheets P. That is, in a case in which the determination unit 260 determines that there is a concern about the generation of offset and blocking, the discharge unit 70 is operated to automatically discharge sheets p collected in the collection section 60.

The function of the discharge controller 290 is achieved by the computer 200. That is, the computer 200 functions as the discharge controller 290 by executing a predetermined program.

<<Printing Processing>>

FIG. 23 is a flow chart showing a procedure of printing processing of the ink jet printing apparatus of this embodiment.

First, it is determined whether or not there is a print job performed previously (Step S81). If there is a print job performed previously, determination information is acquired (Step S82). Then, determination processing is performed using the acquired determination information (Step S83), and it is determined whether or not there is a concern about the generation of offset and blocking (Step S84).

If there is a concern about the generation of offset and blocking as a result of the determination, the discharge unit 70 is driven and sheets P collected in the collection section 60 are discharged (Step S85).

After that, a print job is performed (Step S86).

According to the ink jet printing apparatus of this embodiment, as described above, the sheets P are automatically discharged from the collection section 60 in a case in which there is a concern about the generation of offset and blocking on the sheets P collected in the collection section 60. Accordingly, a concern about the generation of offset and blocking can be prevented in advance. Further, since the sheets are automatically discharged, processing can be efficiently performed even in a case in which a plurality of print jobs are continuously performed.

The information about the number of sheets printed in the previous printing, the information about a LUT used in the previous printing, and the information about the number of sheets printed in this printing can be used to perform the determination processing. In this case, other information may also be used to determine whether or not there is a concern about the generation of offset and blocking. For example, the information about items, which significantly affect offset and blocking, such as the information about a printing speed in the previous printing, the information about the type of a medium used in the previous printing, the information about the weight of the medium used in the previous printing, the information about environmental temperature in the previous printing, the information about environmental humidity in the previous printing, the information about a printing speed in this printing, the information about type of a medium used in this printing, and the information about the weight of the medium used in this printing, may be further used to determine whether or not there is a concern about the generation of offset and blocking. Accordingly, it is possible to further accurately determine whether or not there is a concern about the generation of offset and blocking.

OTHER EMBODIMENTS

<<Color Conversion Processing Device>>

Color conversion processing, processing for generating print data, and the like can be performed by an apparatus that is independent of the ink jet printing apparatus. In this case, the apparatus allows a computer to perform the color conversion processing, the processing for generating print data, and the like. In this case, the computer functions as a color conversion processing device and a print data generating device. The computer functions as the color conversion processing device and the print data generating device by executing a predetermined color conversion processing program and a print data generating program.

<<Ink>>

Cases in which inks having seven colors of cyan, magenta, yellow, black, red, green, and blue are used have been described in the embodiments by way of example, but combinations of colors of inks to be used are not limited thereto.

Even in a case in which inks having four colors of cyan (C), magenta (M), yellow (Y), and black (K) are used, the amounts of different inks can be combined in regard to so-called "gray" (also including black). Accordingly, the invention effectively functions even in a case in which inks having four colors of cyan (C), magenta (M), yellow (Y), and black (K) are used.

For example, two combinations, that is, a first combination of "[C,M,Y,K]=[75,68,67,70]" and a second combination of "[C,M,Y,K]=[0,0,0,100]" can be made in regard to an input color value of "[R,G,B]=[0,0,0] (so-called black)". The first combination is a combination in which a total amount of ink after conversion is large, and the second combination is a combination in which a total amount of ink after conversion is small.

As the number of colors of inks to be capable of being used is increased, the degree of freedom in setting the colors is increased. Accordingly, since the number of colors of each LUT is increased as the number of colors of inks to be capable of being used is increased, the number of colors in which the effect of the invention is made is increased.

Therefore, it is preferable that colors of a plurality of inks to be used include other colors in addition to cyan, magenta, yellow, and black. For example, it is preferable that at least one of orange, red, green, violet, and blue is further included in addition to cyan, magenta, yellow, and black. In this case, at least one combination in which the amount of any one ink of an orange ink, a red ink, a green ink, a violet ink, and a blue ink is included as a value larger than zero is set in a LUT.

<<Ink Jet Printing Apparatus>>

Cases in which the invention is applied to a single-pass type ink jet printing apparatus using line heads have been described in the embodiments by way of example, but the invention can also be applied to a serial type ink jet printing apparatus. A serial type ink jet printing apparatus is an ink jet printing apparatus of which a head prints an image while reciprocating (shuttling) in a direction orthogonal to the transport direction of a medium.

Further, cases in which an image is printed on a sheet of paper have been described in the embodiments by way of example, but the invention can also be applied to a case in which continuous paper is fed and is cut into sheets after printing and the sheets are collected.

EXPLANATION OF REFERENCES

1: ink jet printing apparatus
10: sheet feeding section
12: sheet feeding device
14: feeder board
16: sheet feeding drum
20: treatment liquid applying section
22: treatment liquid applying drum
24: treatment liquid applying device
30: treatment liquid drying section
32: treatment liquid drying drum
34: treatment liquid drying device
40: printing section 42: printing drum
43: sheet pressing roller
44: printing unit
46B: ink jet head
46C: ink jet head
46G: ink jet head
46K: ink jet head
46M: ink jet head
46R: ink jet head
46Y: ink jet head
48: image reading device
50: ink drying section
52: chain gripper
52A: chain
52B: gripper
54: sheet guide
54A: first guide board
54B: second guide board
56: heating-drying device
56A: infrared lamp
60: collection section
62: stacker
70: discharge unit
200: computer
202: interface section
204: operation section
206: display section
208: storage section
210: touch panel
220: data processing section
222: color conversion processing unit
224: print data generation unit
230: LUT selection unit
240: threshold value setting unit
250: determination information acquisition unit
255: maximum value
260: determination unit
270: warning unit
280: sheet detecting unit
290: discharge controller
P: sheet
S11 to S15: procedure for processing image data until print data is generated
S21 to S23: procedure of processing for selecting a LUT
S31 to S35: procedure of processing for selecting a LUT that includes processing for setting a threshold value
S41 to S45: procedure of processing for selecting a LUT in a case in which three LUTs are provided
S51 to S56: procedure of processing for selecting a LUT
S61 to S65: procedure of printing processing
S71 to S78: procedure of printing processing
S77a to S77d: procedure of processing in a case in which a warning is generated
S81 to S85: procedure of printing processing

What is claimed is:

1. An ink jet printing apparatus comprising:
a printing section that prints an image on mediums with inks having a plurality of colors by an ink jet method;
a collection section that collects the mediums on which the image has been printed by the printing section;
an image data acquisition unit that acquires image data to be printed by the printing section;
a printed-medium-number information acquisition unit that acquires information about the number of mediums on which the image data acquired by the image data acquisition unit has been printed;
a color conversion processing unit that converts the image data into ink-amount data corresponding to the plurality of colors by using a look-up table in which combinations of the amounts of output inks corresponding to input color values are prescribed;
a look-up table storage section in which a plurality of look-up tables having different combinations of the amounts of inks are stored;
a look-up table selection unit that selects the look-up table, which is used by the color conversion processing unit, from the plurality of look-up tables, which are stored in the look-up table storage section, on the basis of the information about the number of printed mediums acquired by the printed-medium-number information acquisition unit, and selects a look-up table in which a total amount of ink after conversion is smaller as the number of printed mediums is increased; and
a print data generation unit that generates print data on the basis of the ink-amount data corresponding to the plurality of colors and generated by the color conversion processing unit.

2. The ink jet printing apparatus according to claim 1, wherein each of the plurality of look-up tables stored in the look-up table storage section is set on the basis of a ratio of the amount of a solvent of ink to be combined.

3. The ink jet printing apparatus according to claim 2, wherein a first look-up table in which a total amount of ink after conversion is large overall, a second look-up table in which a total amount of ink after conversion is small overall, and a third look-up table in which a total amount of ink after conversion is smaller than that in the first look-up table in regard to a specific input color value are stored in the look-up table storage section.

4. The ink jet printing apparatus according to claim 1, wherein a first look-up table in which a total amount of ink after conversion is large overall and a second look-up table in which a total amount of ink after conversion is small overall are stored in the look-up table storage section, and
the look-up table selection unit compares the number of printed mediums, which is acquired by the printed-medium-number information acquisition unit, with a threshold value, selects the first look-up table in a case in which the number of printed mediums is smaller than the threshold value, and selects the second look-up table in a case in which the number of printed mediums is equal to or larger than the threshold value.

5. The ink jet printing apparatus according to claim 4, further comprising:
a print information acquisition unit that acquires print information including at least one of information about a printing speed, information about a type of a medium to be used, information about weight of the medium to be used, information about environmental temperature, and information about environmental humidity; and
a threshold value setting unit that sets the threshold value on the basis of the print information acquired by the print information acquisition unit.

6. The ink jet printing apparatus according to claim 5, wherein the threshold value setting unit sets the threshold value on the basis of print information about image data to be printed in this printing and information about the number of mediums on which image data to be printed next is to be printed, in a case in which the image data to be printed next is already acquired.

7. The ink jet printing apparatus according to claim 6,
wherein the threshold value setting unit sets the threshold value on the basis of print information about image data to be printed in this printing, information about the number of mediums on which image data to be printed next is to be printed, and print information about the image data to be printed next, in a case in which the image data to be printed next is already acquired.

8. The ink jet printing apparatus according to claim 4, further comprising:
a threshold value setting unit that sets the threshold value on the basis of information about the number of mediums on which image data to be printed next is to be printed, in a case in which the image data to be printed next is already acquired.

9. The ink jet printing apparatus according to claim 8, further comprising:
a print information acquisition unit that acquires print information including at least one of information about a printing speed, information about a type of a medium to be used, and information about weight of the medium to be used,
wherein the threshold value setting unit sets the threshold value on the basis of information about the number of mediums on which image data to be printed next is to be printed and print information about the image data to be printed next, in a case in which the image data to be printed next is already acquired.

10. The ink jet printing apparatus according to claim 1, further comprising:
a determination information acquisition unit that acquires information about the number of mediums printed in previous printing, information about a look-up table used in the previous printing, and information about the number of mediums printed in this printing as determination information;
a determination unit that determines whether or not there is a concern about the generation of offset and blocking on the basis of the determination information acquired by the determination information acquisition unit; and
a warning unit that generates a warning in a case in which the determination unit determines that there is a concern about the generation of offset and blocking.

11. The ink jet printing apparatus according to claim 10,
wherein the determination information acquired by the determination information acquisition unit further includes at least one of information about a printing speed in the previous printing, information about the type of a medium used in the previous printing, information about the weight of the medium used in the previous printing, information about environmental temperature in the previous printing, information about environmental humidity in the previous printing, information about a printing speed in this printing, and information about the weight of a medium used in this printing.

12. The ink jet printing apparatus according to claim 10, further comprising:
a medium detecting unit that detects whether or not there is a medium present in the collection section,
wherein the determination unit performs determination processing only in a case in which a medium is detected by the medium detecting unit.

13. The ink jet printing apparatus according to claim 12,
wherein the warning unit generates a warning again in a case in which a medium is detected by the medium detecting unit after a predetermined time has passed from the generation of the warning.

14. The ink jet printing apparatus according to claim 1, further comprising:
a discharge unit that discharges the mediums collected in the collection section;
a determination information acquisition unit that acquires information about the number of mediums printed in previous printing, information about a look-up table used in the previous printing, and information about the number of mediums printed in this printing as determination information;
a determination unit that determines whether or not there is a concern about the generation of offset and blocking on the basis of the determination information acquired by the determination information acquisition unit; and
a discharge controller that discharges the mediums collected in the collection section by operating the discharge unit in a case in which the determination unit determines that there is a concern about the generation of offset and blocking.

15. The ink jet printing apparatus according to claim 14,
wherein the determination information acquired by the determination information acquisition unit further includes at least one of information about a printing speed in the previous printing, information about the type of a medium used in the previous printing, information about the weight of the medium used in the previous printing, information about environmental temperature in the previous printing, information about environmental humidity in the previous printing, information about a printing speed in this printing, and information about the weight of a medium used in this printing.

16. A color conversion processing device comprising:
an image data acquisition unit that acquires image data to be printed by an ink jet printing apparatus;
a printed-medium-number information acquisition unit that acquires information about the number of mediums on which the image data acquired by the image data acquisition unit has been printed;
a color conversion processing unit that converts the image data into ink-amount data corresponding to the plurality of colors by using a look-up table in which combinations of the amounts of output inks corresponding to input color values are prescribed;
a look-up table storage section in which a plurality of look-up tables having different combinations of the amounts of inks are stored; and
a look-up table selection unit that selects the look-up table, which is used by the color conversion processing unit, from the plurality of look-up tables, which are stored in the look-up table storage section, on the basis of the information about the number of printed mediums acquired by the printed-medium-number information acquisition unit, and selects a look-up table in which a total amount of ink after conversion is smaller as the number of printed mediums is increased.

17. The color conversion processing device according to claim 16,
wherein each of the plurality of look-up tables stored in the look-up table storage section is set on the basis of a ratio of the amount of a solvent of ink to be combined.

18. The color conversion processing device according to claim 17,
wherein a first look-up table in which a total amount of ink after conversion is large overall, a second look-up table in which a total amount of ink after conversion is small overall, and a third look-up table in which a total amount of ink after conversion is smaller than that in the first look-up table in regard to a specific input color value are stored in the look-up table storage section.

19. The color conversion processing device according to claim 16,
wherein a first look-up table in which a total amount of ink after conversion is large overall and a second look-up table in which a total amount of ink after conversion is small overall are stored in the look-up table storage section, and
the look-up table selection unit compares the number of printed mediums, which is acquired by the printed-medium-number information acquisition unit, with a threshold value, selects the first look-up table in a case in which the number of printed mediums is smaller than the threshold value, and selects the second look-up table in a case in which the number of printed mediums is equal to or larger than the threshold value.

20. The color conversion processing device according to claim 19, further comprising:
a print information acquisition unit that acquires print information including at least one of information about a printing speed, information about a type of a medium to be used, information about weight of the medium to be used, information about environmental temperature, and information about environmental humidity; and
a threshold value setting unit that sets the threshold value on the basis of the print information acquired by the print information acquisition unit.

* * * * *